US012675803B2

(12) United States Patent　(10) Patent No.:　US 12,675,803 B2
Kolano et al.　(45) Date of Patent:　Jul. 7, 2026

(54) LOYALTY INDEX USER INTERFACE

(71) Applicant: MASTERCARD INTERNATIONAL INCORPORATED, Purchase, NY (US)

(72) Inventors: Marek Kolano, Warsaw (PL); Karolina Mojsym-Woźniak, Warsaw (PL); Konrad Kujszczyk, Warsaw (PL); Marta Pedzik, Warsaw (PL)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 23 days.

(21) Appl. No.: 18/651,640

(22) Filed: Apr. 30, 2024

(65) Prior Publication Data

US 2025/0335936 A1　Oct. 30, 2025

(51) Int. Cl.
*G06Q 30/0201*　(2023.01)
*G06F 3/04817*　(2022.01)

(52) U.S. Cl.
CPC ..... *G06Q 30/0201* (2013.01); *G06F 3/04817* (2013.01)

(58) Field of Classification Search
CPC .......................... G06Q 30/0201; G06F 3/04817
See application file for complete search history.

(56) References Cited

U.S. PATENT DOCUMENTS 7,730,408 B2 * 6/2010 Clark .................... G06F 11/328
715/736
8,271,316 B2 9/2012 Blackshaw et al.

11,436,291 B1 * 9/2022 Tayeb ................. G06F 16/9536
2004/0267751 A1 * 12/2004 Dill ..................... G06F 16/2465
707/999.009
2009/0307054 A1 12/2009 D'Imporzano et al.
2013/0173320 A1 7/2013 Bank et al.
(Continued)

FOREIGN PATENT DOCUMENTS

CA　　　　　2861714 A1 * 7/2013 ............. G06F 9/451
KR　10-2010-0123263 A　11/2020

OTHER PUBLICATIONS

Habachi et al. "Unlocking the Effect of the Gameful Experience on Brand Loyalty and Intention to Use: The Mediating Role of Customer Brand Engagement" (retrieved from www.researchgate.net) (Year: 2023).*

(Continued)

*Primary Examiner* — Sujay Koneru
(74) *Attorney, Agent, or Firm* — Barta Jones, PLLC

(57)　　　　　　ABSTRACT

Examples provide a system, method, and computer storage device for automatically presenting a loyalty index for a user. A loyalty index is calculated using transaction details for a plurality of users for a time period. The calculation involves calculating a total entity transaction amount, a total user transaction amount, and an entity proportion for each entity per user. The exclusivity loyalty factor proportion is an average value of the entity proportion for each entity in the favorite entities list weighted by the total entity transaction amount of each user with that entity. The examples present each entity and corresponding exclusivity loyalty factor proportion as an index icon in a user interface and automatically move the index icons to a list in the user interface in descending order of exclusivity loyalty factor proportion.

20 Claims, 8 Drawing Sheets

(56) References Cited

U.S. PATENT DOCUMENTS

| | | | | |
|---|---|---|---|---|
| 2013/0173336 | A1* | 7/2013 | Evans | G06Q 30/0201 |
| | | | | 705/7.29 |
| 2014/0081702 | A1* | 3/2014 | Rohde | G06Q 30/0201 |
| | | | | 705/7.29 |
| 2015/0052032 | A1* | 2/2015 | Aharoni | H04L 51/42 |
| | | | | 705/30 |
| 2015/0220942 | A1* | 8/2015 | Dubberley | G06Q 30/0201 |
| | | | | 705/7.29 |
| 2016/0062621 | A1* | 3/2016 | Delacroix | G06Q 10/10 |
| | | | | 715/771 |
| 2018/0364887 | A1* | 12/2018 | Bell | H04L 67/52 |
| 2020/0273058 | A1 | 8/2020 | Mori et al. | |
| 2020/0294079 | A1* | 9/2020 | Saha | G06Q 30/0226 |
| 2021/0103949 | A1* | 4/2021 | Mullen | G06K 19/07773 |
| 2021/0350403 | A1 | 11/2021 | Tietzen et al. | |
| 2023/0137613 | A1* | 5/2023 | Lai | G06Q 30/0207 |
| | | | | 345/419 |
| 2024/0061555 | A1* | 2/2024 | Cenaj | G06F 9/542 |

OTHER PUBLICATIONS

Kokula Krishna Hari Kunaserkaran, "Research on E-commerce Customer Loyalty under Big Data," International Journal of Advanced Research in Big Data Management System, vol. 4, No. 1, (2020), pp. 1-16.

Ilona Skačkauskienė, et al., "Model for Measuring Customer Loyalty Towards a Service Provider," Journal of Business Economics and Management, 2015 vol. 16(6), pp. 1185-1200.

Don R. Snyder, "Are Purchase Frequency and Consumer Service Loyalty Related?," Albany State University, 2011, 4 pages.

Laihong DU, et al., "Research of Grey Relation Theory Algorithm for Customer Classification of Manufacturing Enterprise," L. Qi (Ed.): FCC 2009, CCIS 34, 2009, pp. 210-217.

Wikipedia, "Purchasing power parity," Retrieved on Apr. 30, 2024 from: https://en.wikipedia.org/wiki/Purchasing_power_parity, 17 pages.

Lee, Kang Ha, "International Search Report & Written Opinion", International Application No. PCT/US2025/016292, mailed May 30, 2025, 10 pages.

* cited by examiner

300

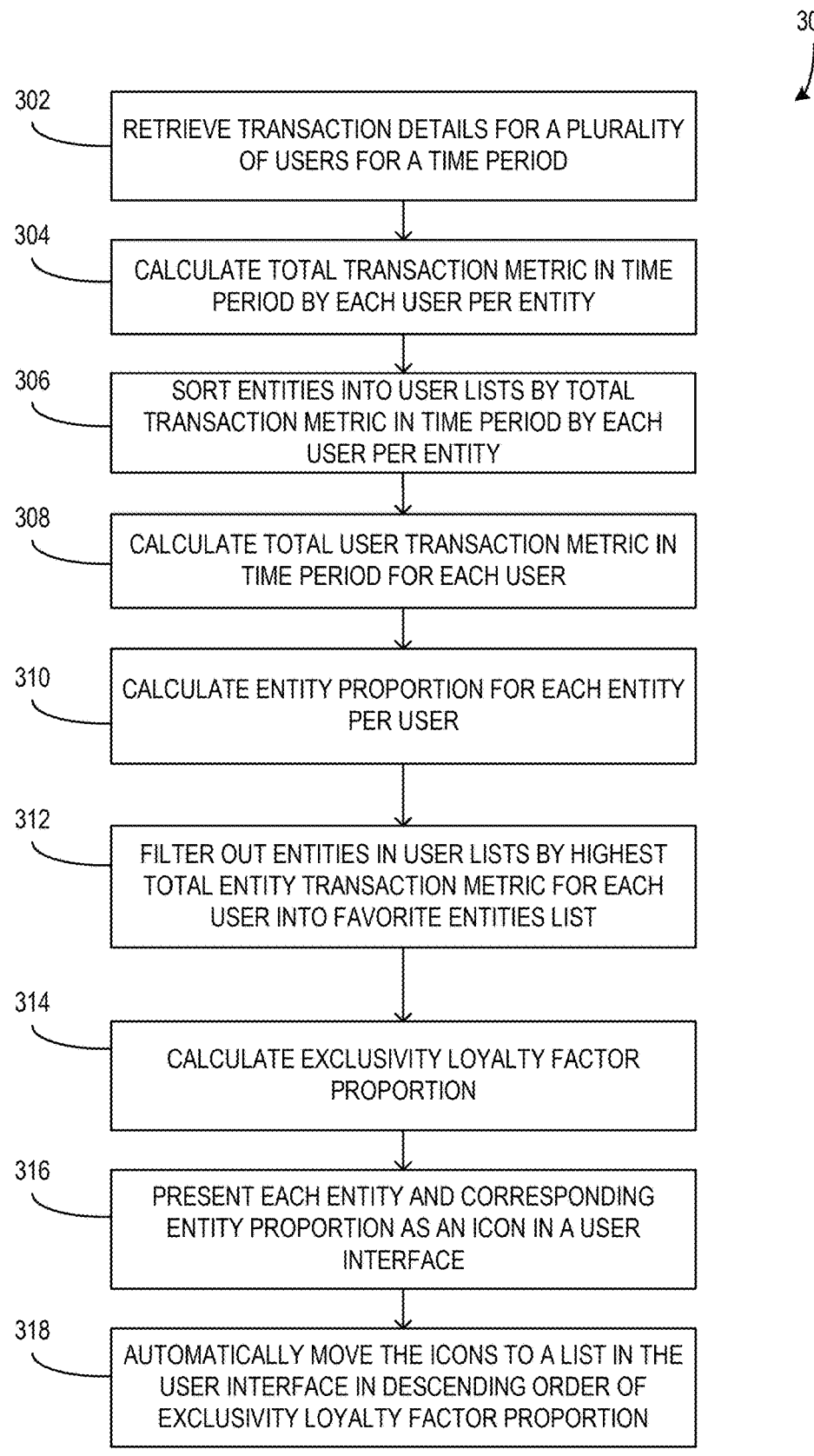

302 — RETRIEVE TRANSACTION DETAILS FOR A PLURALITY OF USERS FOR A TIME PERIOD

304 — CALCULATE TOTAL TRANSACTION METRIC IN TIME PERIOD BY EACH USER PER ENTITY

306 — SORT ENTITIES INTO USER LISTS BY TOTAL TRANSACTION METRIC IN TIME PERIOD BY EACH USER PER ENTITY

308 — CALCULATE TOTAL USER TRANSACTION METRIC IN TIME PERIOD FOR EACH USER

310 — CALCULATE ENTITY PROPORTION FOR EACH ENTITY PER USER

312 — FILTER OUT ENTITIES IN USER LISTS BY HIGHEST TOTAL ENTITY TRANSACTION METRIC FOR EACH USER INTO FAVORITE ENTITIES LIST

314 — CALCULATE EXCLUSIVITY LOYALTY FACTOR PROPORTION

316 — PRESENT EACH ENTITY AND CORRESPONDING ENTITY PROPORTION AS AN ICON IN A USER INTERFACE

318 — AUTOMATICALLY MOVE THE ICONS TO A LIST IN THE USER INTERFACE IN DESCENDING ORDER OF EXCLUSIVITY LOYALTY FACTOR PROPORTION

FIG. 3

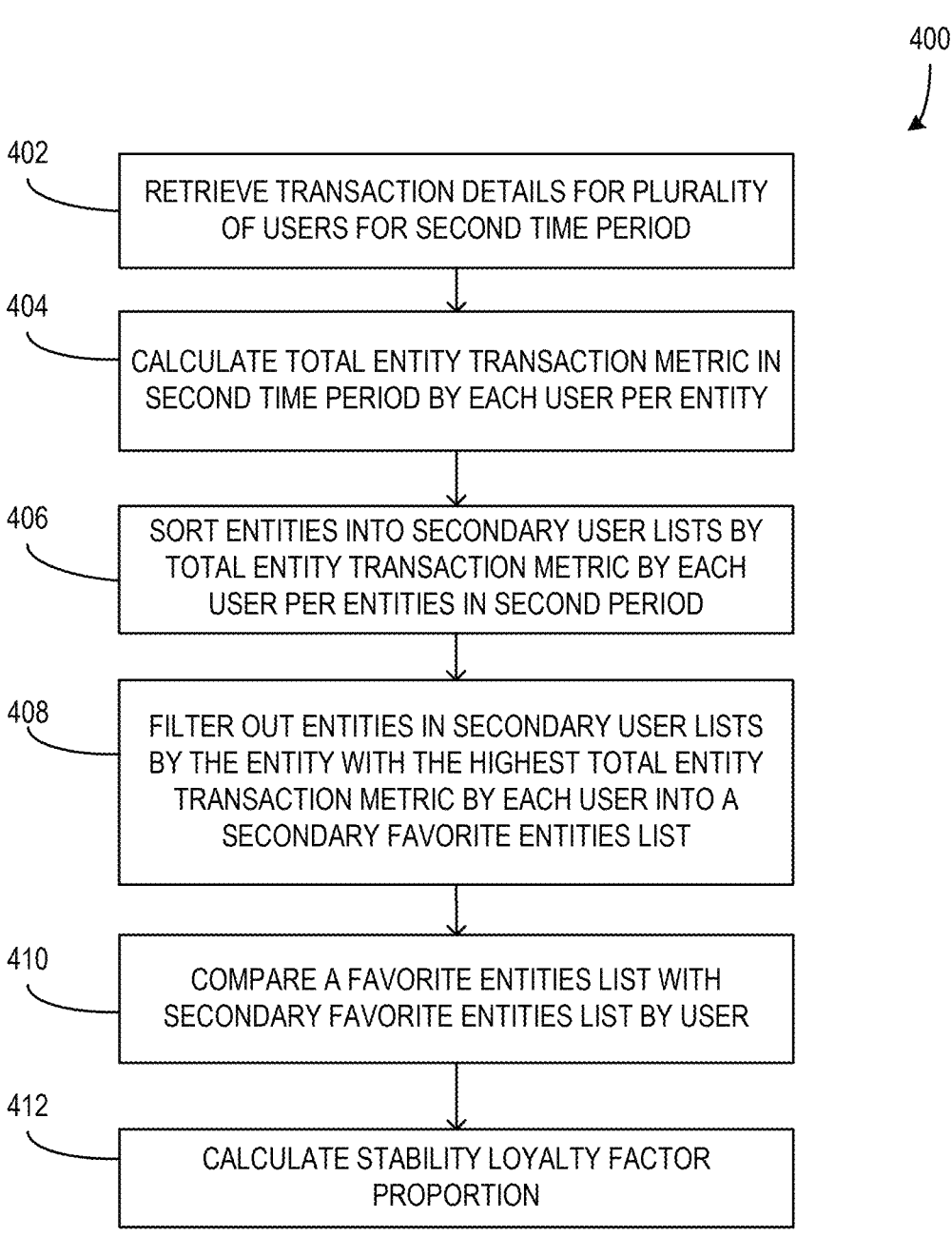

400

402  RETRIEVE TRANSACTION DETAILS FOR PLURALITY OF USERS FOR SECOND TIME PERIOD

404  CALCULATE TOTAL ENTITY TRANSACTION METRIC IN SECOND TIME PERIOD BY EACH USER PER ENTITY

406  SORT ENTITIES INTO SECONDARY USER LISTS BY TOTAL ENTITY TRANSACTION METRIC BY EACH USER PER ENTITIES IN SECOND PERIOD

408  FILTER OUT ENTITIES IN SECONDARY USER LISTS BY THE ENTITY WITH THE HIGHEST TOTAL ENTITY TRANSACTION METRIC BY EACH USER INTO A SECONDARY FAVORITE ENTITIES LIST

410  COMPARE A FAVORITE ENTITIES LIST WITH SECONDARY FAVORITE ENTITIES LIST BY USER

412  CALCULATE STABILITY LOYALTY FACTOR PROPORTION

FIG. 4

Transaction Category Loyalty Index

LOYALTY INDEX USER INTERFACE

BACKGROUND

User interfaces on computers allow users to interact with a computer to view information. User interfaces can use graphical elements and text to present data in different configurations. If information is not initially presented in a user interface, users need to search for that information.

SUMMARY

Some examples provide a system for presenting a loyalty index for a user. The system comprises a processor and a computer storage medium, which stores instructions that are operative upon execution by the processor to retrieve transaction details for a plurality of users for a time period. The transaction details include a user identifier, a transaction metric, a transaction date, and an entity identifier for each transaction in the time period. The processor calculates a total entity transaction metric in the time period by each user per entity and sorts the entities into user lists by total entity transaction metric by each user per entity in the time period in descending order. The processor also calculates a total user transaction metric in the time period for each user and calculates an entity proportion for each entity per user. The total user transaction metric is a summation of the total entity transaction metric of each entity that the user transacted with in the time period and the entity proportion is a proportion of the total entity transaction metric to the total user transaction metric. The processor additionally filters out the entities in the user lists by a highest total entity transaction metric for each user into a favorite entities list and calculates an exclusivity loyalty factor proportion. The exclusivity loyalty factor proportion is an average value of the entity proportion for each entity in the favorite entities list weighted by the total entity transaction metric of each user with that entity. The processor further presents each entity and corresponding exclusivity loyalty factor proportion as index icons in a user interface and automatically moves the index icons to a list in the user interface in descending order of exclusivity loyalty factor proportion.

Other examples provide a method for automatically presenting a loyalty index, the method comprising: retrieving transaction details for a plurality of users for a time period, wherein the transaction details comprise a user identifier, a transaction metric, a transaction date, and an entity identifier for each transaction in the time period; calculating a first loyalty factor proportion for an entity based on the transaction details; calculating a second loyalty factor proportion for the entity based on the transaction details; presenting the first loyalty factor proportion and second loyalty factor proportion for the entity as index icons in a user interface; automatically moving the index icons to a list in the user interface in descending order of the first loyalty factor proportion; and automatically moving the index icons to a list in the user interface in descending order of the second loyalty factor proportion.

Still other examples provide a method for automatically presenting a loyalty matrix, the method comprising: retrieving transaction details for a plurality of users for a plurality of time periods, wherein the transaction details comprise a user identifier, a user location, a transaction metric, a transaction date, an entity identifier, and an entity location for each transaction; calculating an exclusivity loyalty factor proportion, a stability loyalty factor proportion, a convenience loyalty factor proportion, and a prudence loyalty factor proportion for an entity based on the transaction details; calculating a preference loyalty index proportion for the entity, wherein the preference loyalty index proportion is a sum of the exclusivity loyalty factor proportion and the stability loyalty factor proportion divided by two; calculating a rationality loyalty index proportion for the entity, wherein the rationality loyalty index proportion is a sum of the convenience loyalty factor proportion and the prudence loyalty factor proportion divided by two; presenting the preference loyalty index proportion and the rationality loyalty index proportion for the entity as index icons in a user interface; automatically moving the index icons to a list in the user interface in descending order of the preference loyalty index proportion; and automatically moving the index icons to a list in the user interface in descending order of the rationality loyalty index proportion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a flow chart illustrating an example operation of the computing device to present an exclusivity loyalty index on a user interface.

FIG. 4 is a flow chart illustrating an example operation of the computing device to calculate a stability loyalty factor proportion.

Corresponding reference characters indicate corresponding parts throughout the drawings. Any of the figures may be combined into a single example or implementation.

DETAILED DESCRIPTION

Figure 1:
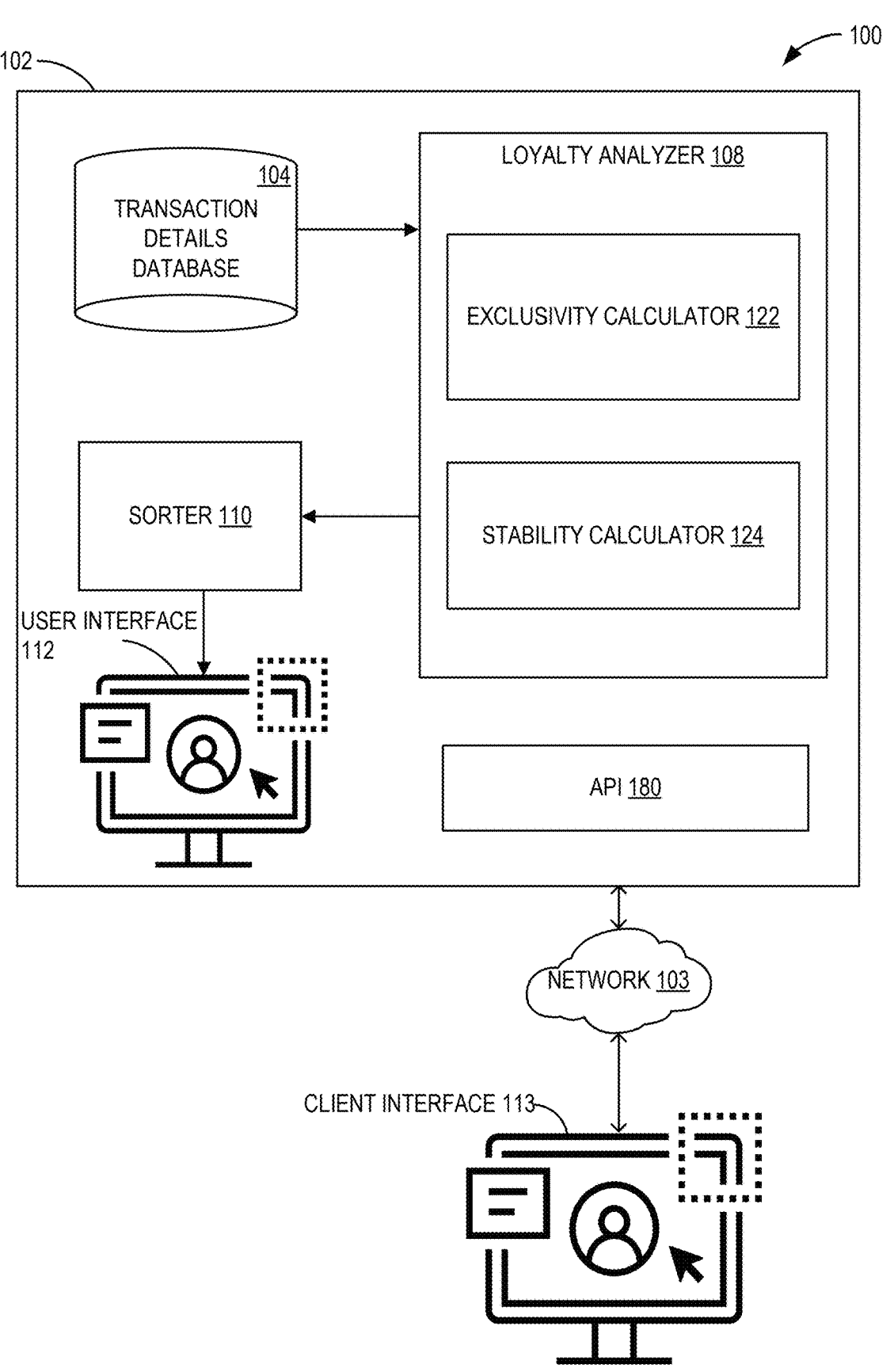
FIG. 1 is a block diagram illustrating an example system for automatically generating and presenting a loyalty index on a user interface.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Existing user interfaces (UIs) provide a barrier for many users. For example, traditional UIs of programs depend on a user's knowledge and experience to understand the purpose of elements presented on a display. Presenting subject-matter specific information on a UI can increase the difficulty for a user to understand if presented in an unintuitive way. For example, a user reading through a list of options that are not arranged in a manner ranked by a metric that is important to the user requires the user to parse through each option to determine that ranking themselves. Additional mental load is placed on the user to understand the metric, especially if the user lacks subject-matter knowledge or expertise, thereby causing additional friction and time spent using the program. For example, these UI issues are found when users attempt to understand a loyalty index. The additional time and repeated interactions of the users with the computing device, e.g., in rearranging the presented information, creates additional computational processing load on the computing device, and consumes additional memory and/or bandwidth.

In addition, in some cases the user might not know the metric that is most useful for them by which to arrange the information. Users that lack subject-matter knowledge or expertise can be especially susceptible to not knowing the metrics that present the information in a beneficial arrangement. Furthermore, even if users do have the knowledge of the desired metric, they might need to hunt down and manually select the metric to arrange the information. This can be onerous to users when the information is not automatically presented and arranged by the metric as the default option. These metric-selecting issues are at least found when users attempt to view a loyalty index. The additional time and repeated interactions of the users with the computing device, e.g., in search of the desired metric, creates additional computational processing load on the computing device, and consumes additional memory and/or bandwidth.

In contrast, in the present disclosure, the automatic presentation of user interface elements, such as icons, text, graphs, and charts, can lower the mental load required for users to understand the information presented. Furthermore, the automatic presentation of the information by the metric calculated to be the most useful to users lowers the barrier for humans to interface with a computing device. These benefits at least accrue to users seeking to view a loyalty index on a user interface.

Users that transact with various entities do so with varying degrees of loyalty to those entities. A user might prefer a single entity over others. Other users might alternate between several different entities or might choose a different entity for every transaction. Users' loyalty to entities might change over time, such as users preferring an entity during one time period and another entity during a different time period. Furthermore, users' loyalty might fluctuate by a transaction category or by some other factor. These loyalty variations for users transacting with entities is calculated into a loyalty index, presented on a user interface, and automatically sorted by a loyalty index metric, as described herein.

The computing device operates in an unconventional manner by calculating and presenting a loyalty index in a user interface automatically. In this manner, the computing device is used in an unconventional way, and allows a user to view the loyalty index in descending order of entity exclusivity loyalty proportion, thereby reducing the computational processing load, memory, and/or bandwidth consumption on the device. This therefore improves the functioning of the underlying device.

Further, aspects of the disclosure improve the usability of the underlying device at least by automatically moving an icon representing the highest entity exclusivity loyalty proportion to the top of a descending list on a user interface. User interaction performance is also improved via additionally presenting an entity stability loyalty proportion in a chart as described herein. This improves the human-machine interaction.

As used in this disclosure, the terms "proportion," "proportion," and "ratio" are to be construed as interchangeable with each other whenever possible. As an example, a ratio of 0.9 could be interchanged with 90%. Additionally, the terms can further be represented fractionally. Further, as used in this disclosure, the term "loyalty index" refers to any presentation of loyalty factor proportion-based data, whether based on a single loyalty factor or multiple loyalty factors. A "loyalty matrix" refers to an index of averages (or other mathematical combinations) of at least two loyalty components, each based on at least one loyalty factor.

Referring to FIG. 1, an exemplary block diagram illustrates a system 100 of a loyalty index generation framework 102 on a computer storage medium. The computer storage medium stores instructions for automatically generating and presenting a loyalty index. A loyalty index portrays a ranking of users' loyalty to transact with specific entities. The framework 102 comprises virtual modules, data stores, processor instructions, program processes, generative pre-trained transformers (GPTs), user interfaces, and data structures. The computer storage medium storing instructions represents any type of computing device/computer storage device executing instructions, such as application programs, operating system functionality, or both. The computing device, in some examples includes a mobile computing device or any other portable device. A mobile computing device includes, for example but without limitation, a mobile telephone, laptop, tablet, computing pad, netbook, gaming device, and/or portable media player. The computing device may also include less-portable devices such as servers, desktop personal computers, kiosks, or tabletop devices. Additionally, the computing device may represent a group of processing units or other computing devices.

A user is any kind of person, a representation of a person, or organization that transacts with an entity. The entity may also be any kind of person, representation or a person, or organization that transacts with the user. In many examples, the entity performs a task/service or provides a product to the user. The identity of the user and the entity as well as the nature of the transaction can take many forms. For example, the user is a software application user, and the entity can be another software application user. Here, the transaction is a message, or a series of messages sent between the user and the entity.

The loyalty index relies on a transaction metric of the transaction to base the loyalty calculations from. Some examples of transaction metrics include an amount of the transaction, a total number of transactions, a total number of visits by a user to the entity, and a total number of a specific transaction subject that was transacted. An amount of the transaction may be the number of messages, the number of words/characters sent in the messages, the total file size of the messages, or some other quantifiable metric. In another example, the user is a customer, and the entity is a merchant. In this case, the transaction is a payment made for goods and the amount of the transaction is the dollar amount that the customer paid the merchant. The specific transaction subject is the message/product/service/task that was sent/consumed/ordered/performed by the entity. In at least one example, a total number of a specific transaction subject that was transacted is a total stock keeping unit (SKU) count by each user per entity.

The framework 102 comprises a transaction details database 104 storing transaction details. In some examples, the transaction details database 104 is a database management system that comprises data stores and interfacing software. The transaction details database 104 stores transaction details on a data store, such as a database. The transaction details include data describing transaction activity between a user and an entity, such as a user identifier, a transaction amount, a transaction date, and an entity identifier. In at least one implementation, the transaction details database 104 stores competitive entity details data that describe transaction details of entities.

The transaction details vary depending on the nature of the user, the entity, and the transaction. For example, if the transaction is an exchange of messages between users of a messaging software application, then the transaction details includes the content of the message(s), the number of words/characters sent in the message(s), the total file size of the message(s), the internet protocol (IP) address of the user or entity, or some other metadata. In another example, if the transaction is a commercial exchange, then the transaction details further include a transaction category, a transaction timestamp, a SKU count, a number of times the user visited the entity, a geographic location of the entity or user, a user demographic, or some other metric.

A loyalty analyzer 108 retrieves the transaction details from the transaction details database 104 to perform a loyalty analysis. The loyalty analysis is a series of calculations of the data in the transaction details that results in a loyalty index. The loyalty analysis quantifies a user's loyalty to a particular entity in at least two dimensions: exclusivity and stability. Exclusivity is a 0 to 100% measure and represents the share of total transactions that a user is making with a specific entity. Stability represents a propensity for a user to change transactions to a different entity measured as a proportion of users who switched primary-transacting entities between at least two analyzed periods. Exclusivity, stability, or both are used to portray a loyalty index in a user interface.

In some examples, after the loyalty analyzer 108 retrieves the transaction details, it calculates a total entity transaction metric in a time period by each user per entity. The total entity transaction metric is a summation of the transaction metric that a user transacted with an entity during the time period. The time period is any set period of time, such as a month, two months, or a year. As discussed above, the transaction metric differs depending on the nature of the transaction. In at least one example, the transaction metric is the transaction amount, and it represents the total file size of messages transacted between the user and the entity. In another example, the transaction amount is the total expenses that a customer spent with a merchant. To calculate the total entity transaction metric, the loyalty analyzer 108 sums the transaction metrics for each transaction in the time period by each user per entity.

After the loyalty analyzer 108 calculates the total entity transaction metric for each entity that a user transacted with during the time period, the loyalty analyzer 108 sorts the entities into user lists by total entity transaction metric in descending order. The user list represents the entities that a user transacted with during the time period. In at least one example, the loyalty analyzer 108 assigns each entity with a number from 1 to N, where 1 is the entity with the greatest transaction metric and N is the entity with the lowest transaction metric in the time period.

Similarly, after the loyalty analyzer 108 retrieves the transaction details, it calculates a total user transaction metric in the time period for each user. The total user transaction metric is a summation of the total entity transaction metric of each entity that the user transacted with in the time period. Using this, the loyalty analyzer 108 calculates an entity proportion for each corresponding entity or entity average per user. The entity proportion is a proportion of the total entity transaction metric to the total user transaction metric. The entity proportion essentially represents the share of a transaction metric for an entity or entity average out of a summed total transaction metric of all entities. If the transaction metric is the frequency of transactions for example, then the entity proportion reflects the user's frequency with conducting transactions with a particular entity out of all entities transacted with during the time period.

In some examples, the user lists have an entry for each user represented and includes the entity identifier, the transaction metric, and the entity proportion. In some examples, each entry also contains a corresponding user identifier and a ranking of each entity of the highest total entity transaction metric. In some implementations, the user identifier is anonymized or otherwise masked to preserve anonymity. In yet other examples, each entry also includes a value representing the time period. In at least one example, the value representing a first time period is 1. The following table is an example user list:

| Time Period | User ID | Entity ID | Ranking | Total Entity Transaction Metric | Entity Proportion |
|---|---|---|---|---|---|
| 1 | 1 | A | 1 | 800 | 82% |
| 1 | 1 | B | 2 | 100 | 10% |
| 1 | 1 | C | 3 | 50 | 5% |
| 1 | 1 | D | 4 | 20 | 2% |
| 1 | 1 | E | 5 | 10 | 1% |

In some implementations, the loyalty analyzer 108 then filters out the entities in each user list into a favorite entities list. In some implementations, the favorite entities list is a total/average of the entity on each user list with the highest ranking, total entity transaction metric, or entity proportion regardless of the entity identifier. The following example is a favorite entities list that uses the entity in 1st place on each user list and is entity identifier agnostic:

| Time Period | User ID | Entity ID | Ranking | Total Entity Transaction Metric | Entity Proportion |
|---|---|---|---|---|---|
| 1 | 1 | A | 1 | 800 | 82% |
| 1 | 2 | B | 1 | 650 | 60% |
| 1 | 3 | A | 1 | 1000 | 70% |
| 1 | 4 | A | 1 | 200 | 53% |
| 1 | 5 | C | 1 | 950 | 79% |

In other implementations, the loyalty analyzer 108 analyzes a favorite a specific entity, resulting in only that specific entity in the favorite entities list. In one implementation, the favorite entities list is a total/average of the specific entity on each user list, but only if the specific entity has the highest entity proportion on the user list. In another implementation, the favorite entities list is a total/average of the specific entity on each user list regardless of ranking. To demonstrate the difference between the two and the favorite entities list of all entities, consider the following example.

A first user makes 9 transactions with 3 different entities. 4 with entity X, 3 with entity Y, and 2 with entity Z. The entities are sorted in a first user list in descending order of entity proportion, with entity X having the highest entity proportion of 44% for the first user. A second user makes 4 transactions—3 with entity Y and 1 with entity Z. The entities are sorted in a second user list in descending order of entity proportion, with entity Y having the highest at 80% for the second user. In the first approach, only the data for entity Y from the second user will be used for the favorite entities list. This is because only the second user has entity Y as the highest entity proportion on their user list. In the second approach, the loyalty analyzer 108 would take the entries of entity Y from both user lists, despite entity Y not having the highest ranking in the first user list. The following chart demonstrates the aggregate approach and the two entity-specific approaches:

| User ID | Entity | # of transactions | Entity proportion | If used for favorite entities list = 1 | | |
|---|---|---|---|---|---|---|
| | | | | 1st ranking entity agnostic | 1st ranking specific entity Y | any ranking specific entity Y |
| 1 | X | 4 | 44% | 1 | | |
| | Y | 3 | 33% | | | 1 |
| | Z | 2 | 22% | | | |
| 2 | Y | 3 | 75% | 1 | 1 | 1 |
| | Z | 1 | 25% | | | |

In some examples, after the loyalty analyzer 108 filters the entities or specified entity into the favorite entities list, an exclusivity calculator 122 calculates an exclusivity loyalty factor proportion for each entity in the favorite entities list. The exclusivity loyalty factor proportion in this example is a measure of the average value of the entity proportion for each user weighted by the total transaction metric each respective user had with that entity. The exclusivity loyalty factor proportion effectively measures users' exclusivity to a particular entity during the time period. Weighting the average entity proportion by the total transaction metric for each user improves the usefulness of the exclusivity loyalty factor proportion in real-world applications since it helps to measure the effect that power users—e.g., users with the highest total transaction metrics—have on the entities.

As mentioned above, the transaction metric can represent various measures or datapoints of a transaction. The exclusivity loyalty factor proportion measures users' loyalty to the entity according to the transaction metric used. An example exclusivity loyalty factor proportion is calculated according to the following expression (Exclusivity Loyalty Index$_{exclusivity}$) where N is the number of users that transacted with that entity during the time period.

$$\frac{\sum_{i=1}^{N}(\text{entity proportion}_i * \text{total transaction metric}_i)}{\sum_{i=1}^{N}\text{total transaction metric}_i}$$

In various implementations, the transaction metric is a transaction amount, a transaction number, a visit number, or transaction subject count. A loyalty index containing multiple exclusivity loyalty factor proportions of differing transaction metrics is useful to compare user loyalty across multiple dimensions.

After the exclusivity loyalty factor proportion is calculated for each entity in the favorite entities list, a sorter 110 presents each entity and corresponding exclusivity loyalty factor proportion as an index icon in a user interface 112. The icon includes, for example, an image, a text description, some combination of both, or some other visual representation. The visual icon may also include a natural language description of the exclusivity loyalty factor proportion.

Figure 5:
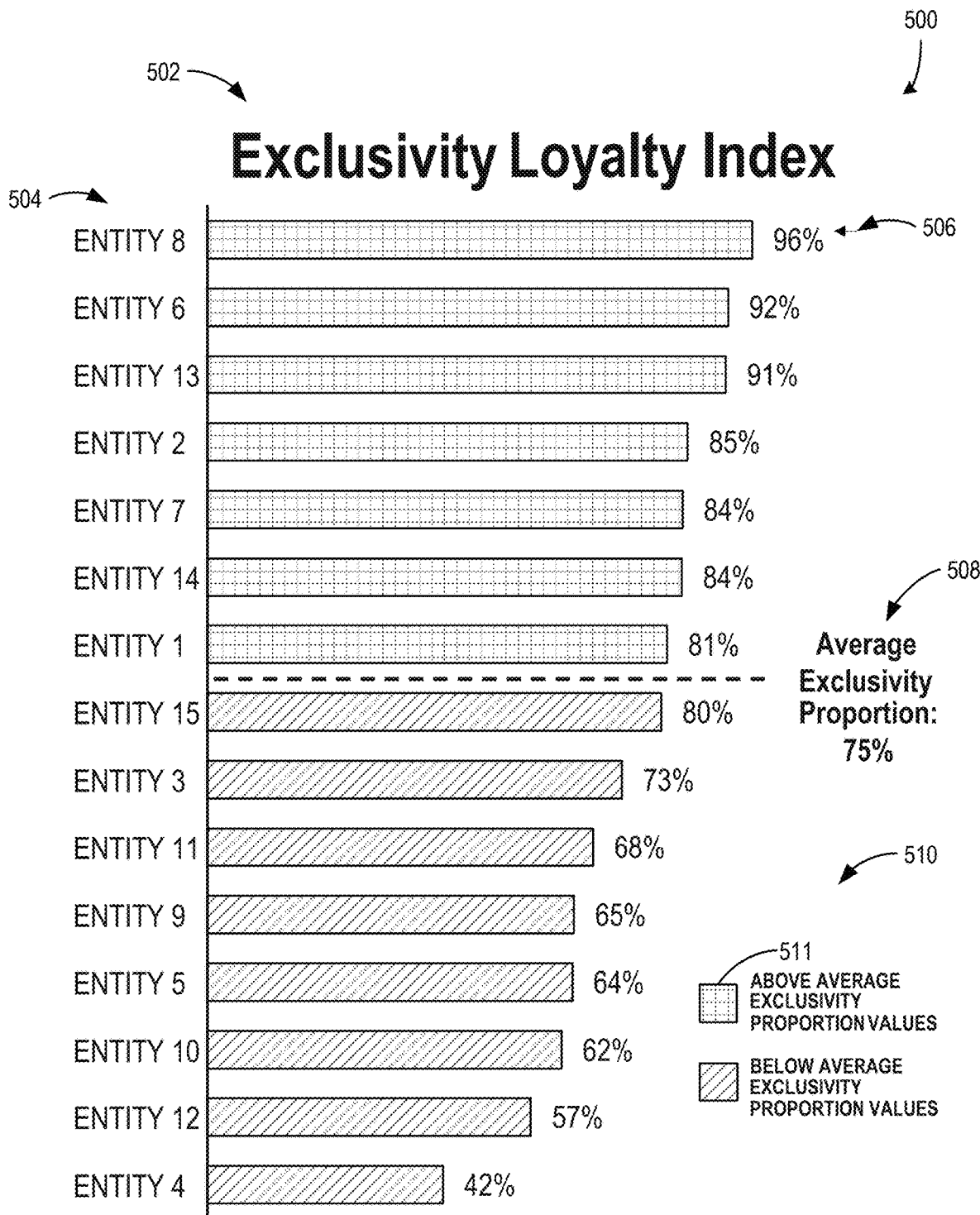
FIG. 5 is an example user interface displaying a list of entities in descending order of exclusivity loyalty factor proportion.

The sorter 110 automatically moves the index icons into a list in the user interface in descending order of exclusivity loyalty factor proportion. The user interface 500 as shown in FIG. 5 is an illustrative example of presenting and automatically moving icons into a descending order exclusivity loyalty factor proportion list. By automatically moving the icons in a descending list, the system 100 improves human-computer interaction, including the user's experience with the user interface 112.

In some examples, the loyalty analyzer 108 also calculates a stability loyalty factor proportion via a stability calculator 124. An example stability loyalty factor proportion is the proportion of users who had a different highest transaction amount entity between two analyzed time periods. A high stability loyalty factor proportion means that users tend to transact with the same entity across multiple time periods.

To calculate the stability loyalty factor proportion, the loyalty analyzer 108 retrieves transaction details for at least a second time period. In some examples, the loyalty analyzer 108 retrieves transaction details for many time periods, such as transaction details for twelve time periods with each time period representing a month of the year. From there, the loyalty analyzer 108 calculates a total entity transaction metric, sorts the entities into secondary lists by total transaction metric, and filters out the entities in the secondary lists by the entity with the highest total transaction metric by each user per entity in the second time period. The loyalty analyzer 108 performs the same operations described above to calculate these values but using the transaction details from the second or greater time period. Filtering out the entities by the highest transaction metric in the second time period results in a secondary favorite entities list. The loyalty analyzer 108 calculates the values above for each time period of the transaction details.

The stability calculator 124 compares the favorite entity list with the secondary favorite entities list by user. The stability calculator 124 calculates the stability loyalty factor proportion by summing the number of entries that are the same on the favorite entity list and the secondary favorites entity list divided by the number of users. In some examples, the stability calculator 124 calculates the stability loyalty factor proportion according to the following expression (Stability Loyalty Index$_{stability}$) where N is the number of users that transacted with that entity during the time period.

$$1 - \frac{\sum_{i=1}^{N} (\text{users where highest trans metric entity are different})}{N}$$

Figure 6:
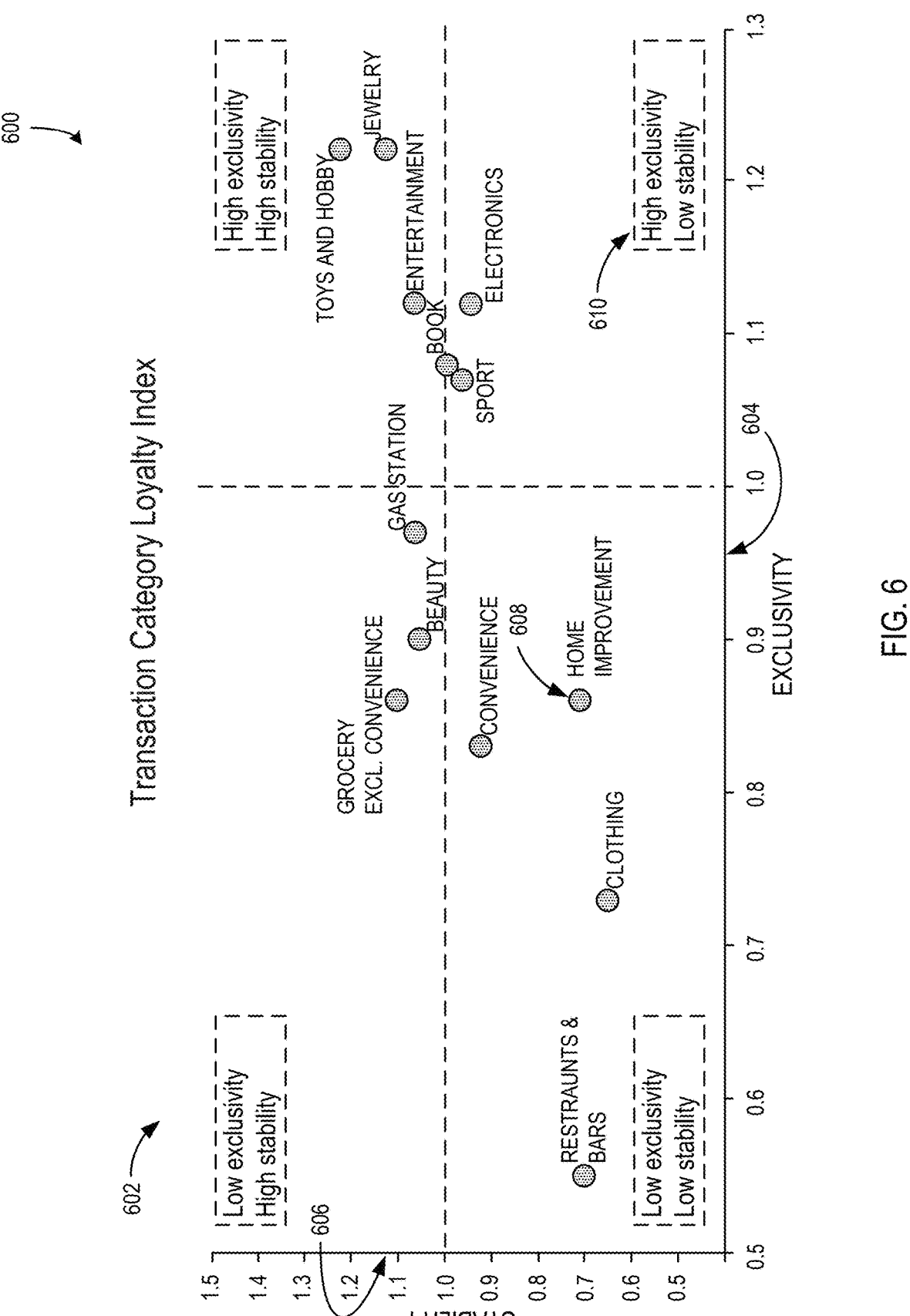
FIG. 6 is an example user interface displaying a chart of loyalty index categories by exclusivity loyalty factor proportion and stability loyalty factor proportion.

After the stability loyalty factor proportion is calculated for each entity in the favorite entities list, a sorter 110 presents each entity and corresponding stability loyalty factor proportion as an index icon in a user interface 112 just as with the exclusivity loyalty factor proportion. In some implementations, the sorter 110 also presents both the stability loyalty index and exclusivity proportions in a chart, diagram, or other visual presentation such as shown in FIG. 6. In at least one example, the sorter 110 presents the stability loyalty factor proportion with the corresponding index icon in the user interface and automatically moves the index icons to a list in the user interface in descending order of stability loyalty factor proportion that is perpendicular to the list of exclusivity loyalty factor proportion. Each of the exclusivity and stability loyalty indexes are preferences indexes since they describe behavioral loyalty of users to entities. From the perspective of the entity, an ideal state is when the entity has high exclusivity and high stability proportions. The opposite is low exclusivity and low stability proportions. A combined exclusivity and stability index is referred to as a preference index.

In some examples, the framework 102 includes an application programming interface (API) 180 that allows the framework 102 to present the exclusivity loyalty index and/or stability proportions on a client interface 113 of a client device via a network 103. In some examples, the client device is operated by an application user to view the loyalty factor proportions remotely. Including remote interfacing capabilities to the framework 102 improves the case of use for users in accessing the framework 102.

Figure 2:
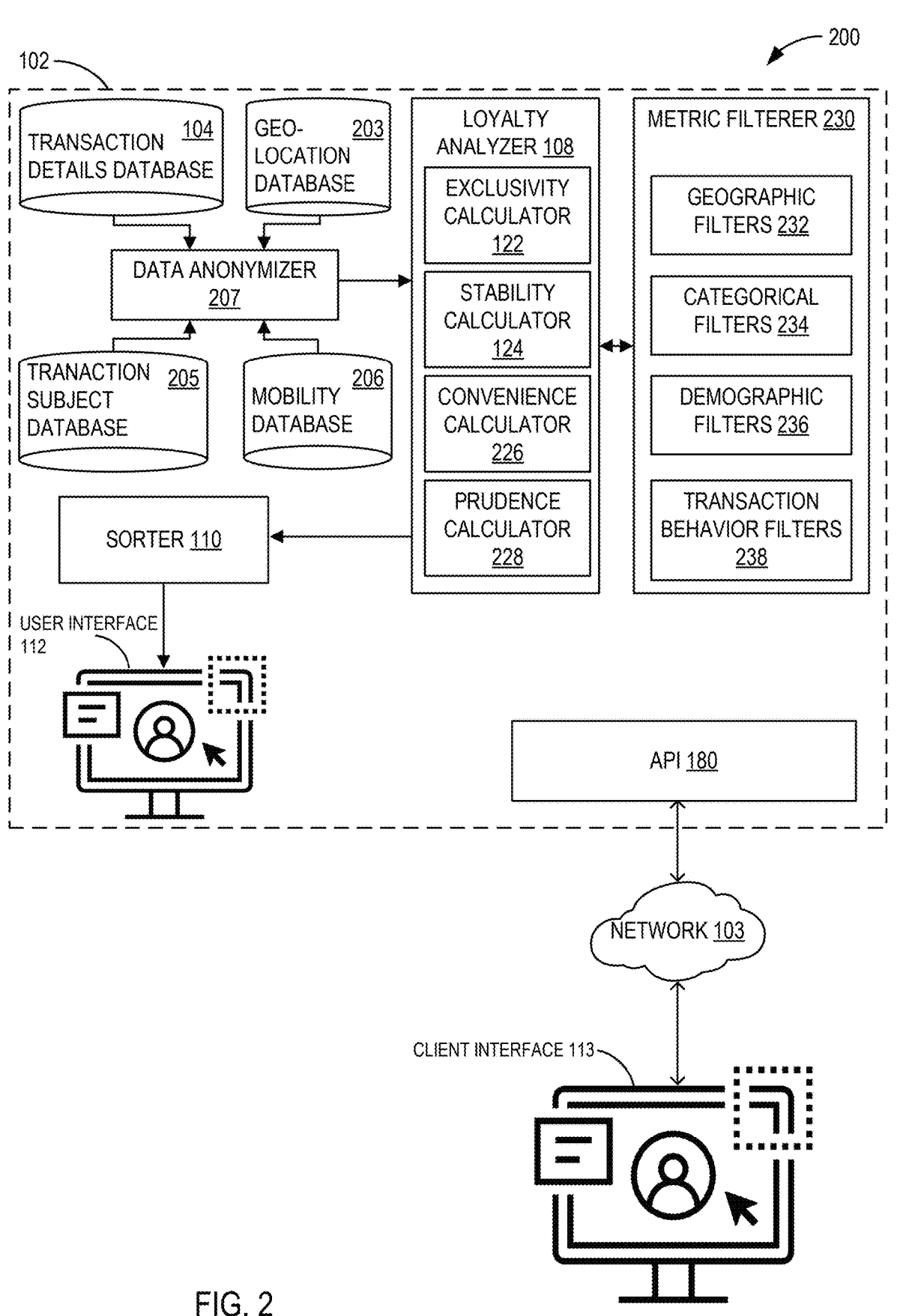
FIG. 2 is a block diagram illustrating an example system for automatically generating and presenting a loyalty index that includes an exclusivity and stability proportion on a user interface.

FIG. 2 is an exemplary block diagram illustrating a system 200 using a framework 102 for automatically generating and presenting a loyalty index on a computing device. The framework 102 includes a loyalty analyzer 108 and a metric filterer 230 that uses various filters to modify the loyalty index according to specific metrics. In the example of FIG. 2, the computing device represents any device executing computer-executable instructions (e.g., as application programs, operating system functionality, or both) to implement the operations and functionality associated with the computing device. Some aspects of the system 200 are implemented as described above in FIG. 1.

A loyalty analyzer 108 retrieves data from a transaction details database 104, a geo-location database 203, a transaction subject database 205, and a mobility database 206 for generating a loyalty index. The loyalty analyzer 108 interfaces with the metric filterer 230 to modify the loyalty index calculation. The framework 102 then provides the loyalty index to an application user using a sorter 110 or an API 180. The application user views the loyalty index via user interface 112 or on the client interface 113 of a client device via network 103.

The geo-location database 203 stores data related to entities and users' locations. This includes geographic data, such as the latitude and longitude coordinates of a fixed physical location. This also includes location address data, including country, city, province, zip-code, street address, and building number. The mobility database 206 stores data related to transient entity and user locations. This includes a transaction centroid and frequent places of visit. The transaction centroid is the most frequent area (e.g., zip-code, quad, quadrant, catchment, etc.) where a user visits, makes transactions, or spends time (or some combination). In some implementations, the mobility database 206 and the geo-location database 203 are located in the same data store or are otherwise interlinked with each other.

In at least one example, either the mobility database 206 or the geo-location database 203 includes data on the distance between a user and an entity. Any method (e.g., drivetime, cartesian distance, or any other way of expressing physical distance) is used to calculate the distance between two points. In some implementations, the user location is a home address, area of residence, work address, transaction centroid, or frequent place of visit. If an entity is primarily virtual, then measures such as cross border delivery indication or an expected actual delivery time can be used as a distance proxy.

In some implementations, the loyalty analyzer 108 includes an exclusivity calculator 122 and a stability calculator 124 as described above in FIG. 1 as well as a convenience calculator 226 and a prudence calculator 228. The convenience calculator 226 calculates a convenience loyalty factor proportion that measures user's willingness to transact with a specific entity as opposed to a nearer entity in a same transaction category or that the user also transacts with. The prudence calculator 228 calculates a prudence loyalty factor proportion that measures a user's tendency to make rational transaction choices based on reducing transaction expenses. Each of the convenience and prudence loyalty indexes are rationality indexes since they describe users' tendencies to make rational transaction decisions regarding entities.

The convenience calculator 226 calculates the convenience loyalty factor proportion by averaging the proportion of distance between users' locations to an entity location and the users' locations to a nearest competitive entity location weighted by a total transaction metric of each user with that entity. In some examples, the convenience calculator 226 calculates the convenience loyalty factor proportion according to the following expression (Convenience Loyalty Index$_{distance\ based\ \%}$) where N is the number of users that transacted with that entity during the time period.

$$\frac{\sum_{i=1}^{N} \left( \frac{\text{entity distance vs competition ratio}_i *}{\text{total transaction metric}_i} \right)}{\sum_{i=1}^{N} \text{total transaction metric}_i}$$

As an example, assume a user has a given fixed location of a certain latitude and longitude. To calculate a convenience loyalty factor proportion, the loyalty analyzer 108 determines where the person made a transaction and overlays geographic data of each other entity where the user also made a transaction in the time period. The loyalty analyzer 108 calculates a distance (such as minutes drivetime) between the user's fixed location and each entity location where they make transactions (see table below). The loyalty analyzer 108 then calculates the proportion between the distance to a first entity on a user list and the distance between the user and the closest competitive entity. This represents how far the user is from the most conveniently placed entity. Then for the whole transaction category or for a specific merchant, the convenience calculator 226 calculates an average convenience loyalty factor proportion that is weighted by a total transaction metric.

| A<br>User<br>ID | B<br>Entity<br>ID | C<br>Total entity<br>transaction<br>metric | D<br>Total user<br>transaction<br>metric | E<br>Entity<br>Proportion | F<br>Distance<br>from user<br>to entity<br>[in<br>drivetime<br>minutes) | G<br>Minimal<br>distance<br>excluding 1st<br>place entity<br>[in minutes<br>drivetime] | H<br>Ratio between<br>distance to 1st<br>place entity and<br>minimal distance<br>[F/G] |
|---|---|---|---|---|---|---|---|
| 1 | X | 200 | 350 | 57% | 4 | 3 | 1.33 |
| 1 | Y | 100 | | 29% | 3 | 3 | 1.00 |
| 1 | Z | 50 | | 14% | 12 | 3 | 4.00 |
| 2 | Y | 250 | 270 | 93% | 7 | 6 | 1.17 |
| 2 | Z | 20 | | 7% | 6 | 6 | 1.00 |
| All | | 620 | 620 | 73% | | | 1.26 |

In some implementations, the minimal distance is the average distance to a nearest competitive entity. In other examples, the minimal distance is calculated for an entity outside of the list of entities where the customer interacts. This is for situations where an entity is not on a user list but is still relatively close to the user.

A convenience loyalty factor proportion (Column H in table above) greater than one means that the first entity on the user list is further than the most convenient competition. Less than one means that the first entity is closer than the closest competition. A proportion of one means the distance to the first entity is the same as nearest competition.

The prudence calculator 228 calculates the prudence loyalty factor proportion by averaging the value of the proportion of average transaction expense between the entity and a nearest competitive entity weighted by a total transaction metric of each user with that entity. In some examples, the prudence calculator 228 calculates the prudence loyalty factor proportion according to the following expression (Prudence Loyalty Index$_{expense}$) where N is the number of users that transacted with that entity during the time period.

$$\frac{\sum_{i=1}^{N} \left( \frac{\text{entity expense vs competition expense}_i *}{\text{total transaction metric}_i} \right)}{\sum_{i=1}^{N} \text{total transaction metric}_i}$$

In some implementations, the prudence loyalty index can be calculated based on a "representative basket" comparison. The representative basket is a collection of transaction subject expenses that are tracked over time to produce a subject/category/overall synthetic expense comparison index. For example, if all compared subjects are on average 5% less expensive with entity X vs the competition, then the expense index of entity X is 0.95. An expense index can be adjusted by promotion conditions and other information, such as a loyalty program discounts. The following is an example basket expense index:

| | Entity X | Entity Y | Entity Z | . . . | Entity N | Average<br>(w/o entity X) |
|---|---|---|---|---|---|---|
| Subject A | 12 | 13 | 14 | 12 | 14 | 13.25 |
| Subject B | 10 | 11 | 10 | 10 | 9 | 10.00 |
| Subject C | 40 | 39 | 44 | 38 | 38 | 39.75 |
| SUM | 62 | 63 | 68 | 60 | 61 | 63.00 |

The example above demonstrates that entity X is less expensive than the competition average and from individual entities as well. Entity X's relative discount compared to its competition is reflected in the prudence loyalty factor proportion, as shown in the example below. In the following example, entity X is the entity with the highest transaction metric for the first user and it is located relatively closer to the first user than an average competitive entity.

| A User ID | B Entity ID | C Total entity transaction metric | D Total user transaction metric | E Entity Proportion | F Entity expense amount | G Expense amount (single or average) of nearest competition | H Ratio between 1st place entity and nearest competition [F/G] |
|---|---|---|---|---|---|---|---|
| 1 | X | 200 | 350 | 57% | 120 | 125 | 0.96 |
| | Y | 100 | | 29% | 125 | 125 | 1.00 |
| | Z | 50 | | 14% | 130 | 125 | 1.04 |
| 2 | Y | 250 | 270 | 93% | 99 | 85 | 1.16 |
| | Z | 20 | | 7% | 85 | 85 | 1.00 |
| All | | 620 | 620 | 73% | | | 1.05 |

In some implementations, the expense amount of the nearest competition is calculated as a single benchmark of one or more competitive entities. In various implementations, the nearest competition is the nearest competitive entity to the user. In other implementations, The nearest competition is the nearest entity to the entity that is the focus of the index.

The loyalty index is not limited to measuring a user's loyalty to entities based on a total transaction metric in a time period. In some implementations, the loyalty index calculation is adapted to compare users' loyalty using a variety of filters that narrow the transactions to those that meet certain criteria. The criteria include various metrics of the data of the transaction details. The metric filterer 230 uses various filters to modify the loyalty index calculation according to the metrics of the transaction details. In some examples, the metric filterer 230 includes geographic filters 232, categorical filters 234, demographic filters 236, and/or transaction behavior filters 238.

The various filter categories of the metric filterer 230 provide different filtering options depending on the nature of the user, entity, and/or transaction. The geographic filters 232 pertain to a geographic location of users, such as a user residence, entities, such as an entity server location or storefront, the transaction itself, such as a server location separate from the entity location. If the transaction nature is a digital message sent between application users, then the categorical filters 234, for example, pertain to the type of digital messaging of the transaction (e.g., instant messaging, video messaging, audio calling, etc., email, etc.). In other examples, the categorical filters 234 pertain to a specific transaction category, transaction subject (e.g., item, service, etc.) or transaction channel. The demographic filters 236 pertain to users or entities demographic metrics, such as age, gender, ethnicity, education, etc. The transaction behavior filters 238 pertain to user behavior with the digital messaging environment, such as filters relating to user time spent in the digital messaging application, the frequency that a user opens the application or refreshes the application to check for messages, or the average size of messages sent by the user.

The metric filterer 230 uses one or more filters from the various filter types to generate loyalty indexes beyond a total transaction amount calculation. The following are different, non-exclusive examples of loyalty indexes: (1) loyalty calculated according to users/entities in predefined or custom regions (e.g., country, counties, cities); (2) loyalty by a transaction category (e.g., grocery, fashion, restaurants); (3) loyalty by entities in close proximity to the user; (4) loyalty to an entity depending on geographic location and distance from users' homes; (5) loyalty divided by a transaction channel (e.g., brick-and-mortar, online, etc.); and (6) loyalty divided by population range (e.g., age, gender, ethnicity, etc.). These examples show the use of one or more filters on the loyalty index calculation. For example, the loyalty calculated according to users/entities in predefined or custom regions use the geographic filters 232 to narrow the transaction details to only those users and/or entities in those geographic regions. A transaction category filter may also be applied to further limit the transaction details to only those entities of the same transaction category residing within those geographic regions.

In some implementations, the metric filterer 230 calculates a distribution proportion of users for whom the entity is the first, second, third, etc. rank in each user's user list. The distribution proportion is calculated for a specific entity, a competitive entity benchmark, or both. In other implementations, the metric filterer 230 calculates an index for a specific location for an entity comprising multiple locations. In such cases, the subject entity of the calculation would be the sub-entity at that particular location. In yet other implementations, the metric filterer 230 calculates a distribution of each loyalty factor proportion, such as a Bayesian distribution. Here, the distribution is the loyalty factor proportion on one axis and the percent of users for the entity at that proportion value on the other axis. In still other implementations, the metric filterer 230 calculates correlations between loyalty factor proportions, such as users' convenience loyalty factor proportion of a given entity vs its competition on one axis and the exclusivity loyalty proportion of those users on the other axis. In further implementations, the metric filterer 230 calculates the rate in which an exclusivity index proportion decreases when the distance to a nearest competitive store decreases and compares this rate to competitive entities. In various implementations, the decrease rate is calculated as the area under the curve, a GINI coefficient, or as a function of stepwise decrease rate.

In at least one implementation, the metric filterer 230 filters entities in user lists that are beyond a specified distance by the highest total entity transaction metric for each user into a favorite distant entities list. The favorite distant entities list represents entities that users are loyal to despite needing to travel up to and beyond the specific distance.

In some examples, these loyalty indexes are predicted and modeled using machine learning and artificial intelligence. In such cases, the target loyalty variable (e.g., any of the exclusivity loyalty index or stability proportion or both) are used to train a model with transaction detail data. The machine learning model has access to various metrics in the transaction details and identifies previously unknown correlations by attempting to replicate the target loyalty variable.

In some cases, transaction details contain inherent identifying information about the user and the entity. To protect user and entity privacy and anonymity, the transaction details are anonymized via data anonymizer 207 to remove identifying information. Anonymization includes the removal of personally identifiable information, such as an individual's name, age, address, and social security number. Alternatively, anonymization includes the masking of personally identifiable information to preserve realistic data entries for the loyalty analysis. The data anonymization is performed through the use of tokenization or other cryptographic methods to improve data security.

Figure 7:
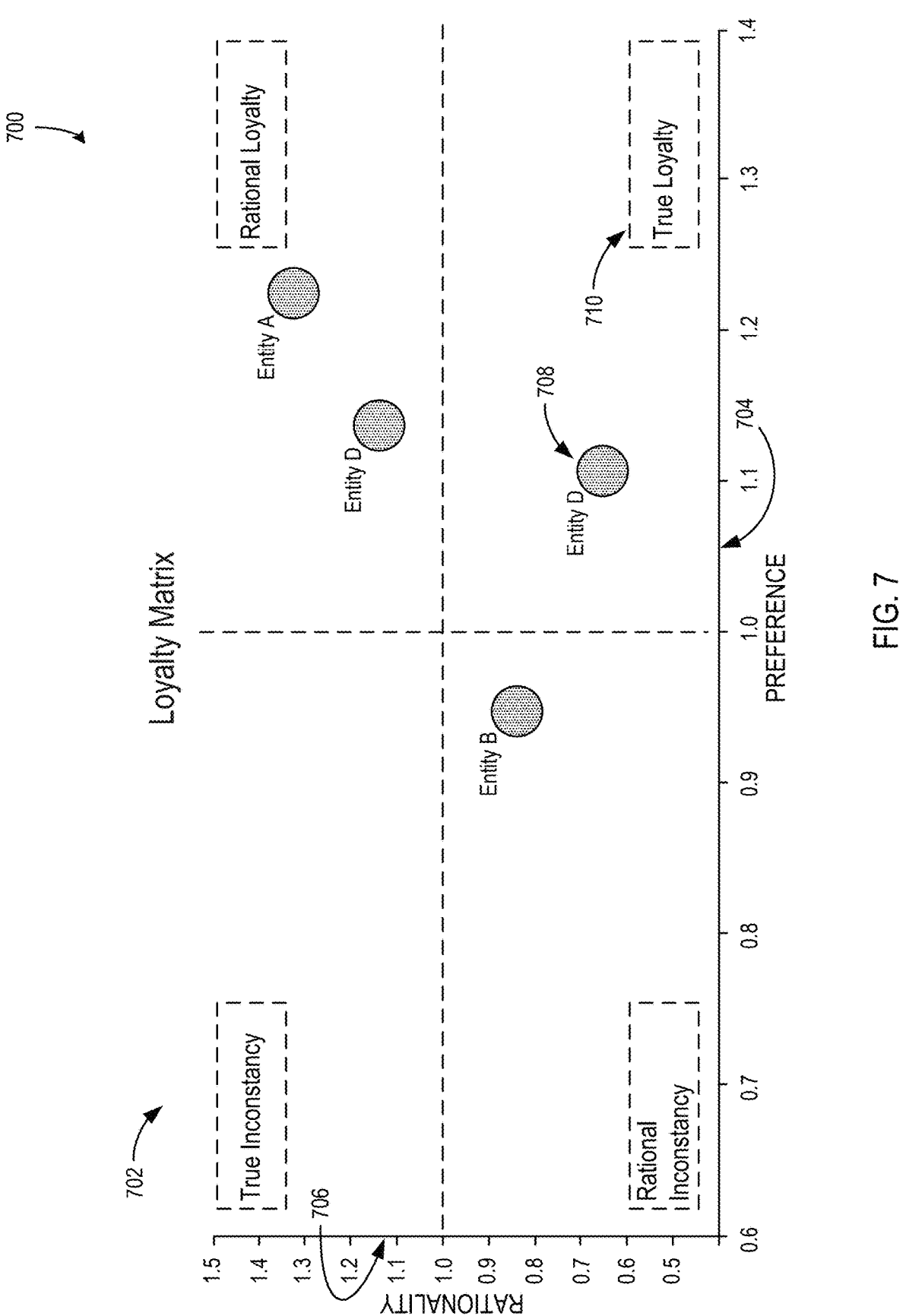
FIG. 7 is an example user interface displaying a loyalty matrix chart by rationality index proportion and preference index proportion.

In at least one implementation, the framework 102 generates and presents a benchmark loyalty index. The benchmark loyalty index is tailored to an entity that is the subject of a loyalty index. For example, if the entity is an instant messaging provider, then the benchmark loyalty index is an average loyalty index of all instant messaging entities in the transaction details. In other examples, if the entity is a merchant in the fashion industry, the benchmark loyalty index is an average loyalty index of all fashion merchants in the transaction details. The benchmark loyalty index is presented along with another loyalty index in a user interface 112 or client interface 113. In some implementations, the framework 102 generates and presents a loyalty matrix as shown in FIG. 7.

FIG. 3 is an exemplary flow chart 300 illustrating operation of the computing device for automatically generating and presenting an exclusivity loyalty index. The process shown in FIG. 3 is implemented by a framework executing on a computing device, such as, but not limited to, the computing device of FIG. 1 and FIG. 2.

The process begins with retrieving transaction details for a plurality of users for a time period at 302. The transaction details comprise various data relating to transactions between a user and an entity, such as a user identifier, a transaction metric, a transaction date, and an entity identifier. The transaction details include transaction data for each transaction in the time period.

The process continues with calculating a total entity transaction metric at 304. The total entity transaction metric is the sum of all transaction metrics in the time period by each user per entity. Stated another way, the calculation for the total entity transaction metric is specific to each user and describes the summed transaction metrics for each entity that the user transacted with during the time period.

Next, the process sorts the entities into user lists by total entity transaction metric at 306. The sorting by total entity transaction metric is based on transactions in the time period by each user per entity. The entities may be sorted in descending order of total entity transaction metric for each user. Then, the process calculates a total user transaction metric at 308. The total user transaction metric is specific to each user in the time period. Stated another way, in the time period, the total user transaction metric for a user is equal to the sum of all total entity transaction metrics for that user.

Next, the process calculates an entity proportion for each entity per user at 310. The entity proportion is a proportion of the total user transaction metric that each user transacted with each entity in the time period. Stated another way, the entity proportion for each entity is that entity's total transaction metric divided by the total user transaction metric.

The process continues by filtering out the entities in the user lists by the highest total entity transaction metric for each user into a favorite entities list at 312. Only the highest transaction metric entity for each user is added to the favorite entities list. Each entry on the favorite entities list can include an entity identifier for the respective entity, a user identifier for the respective user, the entity total transaction metric, and the entity proportion.

Next, the process calculates an exclusivity loyalty factor proportion at 314. The exclusivity loyalty factor proportion is the average value of the entity proportion weighted by the total entity transaction metric of each user with that entity. Stated another way, the exclusivity loyalty factor proportion is the average of the entity proportion multiplied by the total entity transaction metric for each user that is then divided by the average total entity transaction metric. The exclusivity loyalty factor proportion does not have to be a percentage out of one hundred, it can also be a number, ratio, or factor.

Then, the process presents each entity and corresponding exclusivity loyalty factor proportion as an index icon in a user interface at 316. Finally, the process automatically moves the index icons to a list in the user interface at 318. The index icons are lists in descending order of exclusivity loyalty factor proportion.

FIG. 4 is an exemplary flow chart 400 illustrating operation of a framework for automatically generating and presenting a stability loyalty factor proportion. The process shown in FIG. 4 is implemented by a framework executing on a computing device, such as, but not limited to, the framework executing on a computing device as shown in FIG. 1 and FIG. 2. The process of FIG. 4 begins after some, or all of the process of FIG. 3 has occurred.

The process begins with retrieving transaction details for a plurality of users at 402. The transaction details relate to transactions for a second time period. The transaction details for the second time period are for the same or different users or entities than transaction details for a time period.

The process continues with calculating a total entity transaction metric at 404. The total entity transaction metric is specific to the second time period by each user per entity. The total entity transaction metric in the second time period can be calculated as the total entity transaction in the time period as described above in FIG. 3.

Then, the process sorts the entities into secondary user lists by total transaction metric by each user per entity in the second time period at 406. The entities are sorted into the secondary user lists in descending order of total entity transaction metric. For example, the entities are sorted the same way as the entities into the user lists in FIG. 3. Next, the process filters out the entities in the secondary user lists by the entity with the highest total transaction metric by each user into a secondary favorite entities list at 408. In some examples, the entities are filtered out into a secondary favorite entities list the same way as the entities filtered out into a favorite entities list in FIG. 3.

Continuing, the process compares a favorite entity list with the secondary favorite entities list by user at 410. The favorite entity list is a list of entities with the highest total entity transaction metric for each user in a time period prior to the second time period. The two lists are compared by each user.

The process calculates a stability loyalty factor proportion at 412. The stability loyalty factor proportion is the number of entities that are the same on the favorite entity list and the secondary favorite entities list per user divided by the number of users. Stated another way, the stability proportion represents how many users' highest total transaction metric entity was the same in both time periods. Optionally, the process presents the stability loyalty factor proportion as index icons in a user interface and automatically sorts the icons in descending order of stability loyalty factor proportion. One purpose for automatically moving the icons in a descending is to improve the human-machine interaction for application users.

FIG. 5 is an exemplary illustration of a user interface 500 operating on a computing device that presents an exclusivity loyalty index 502 comprising an exclusivity loyalty factor proportion 506 for several entities 504. A user interacts with the user interface 500, and the user interface 500 presents the exclusivity loyalty index 502 using text and images from a framework, such as the framework 102 as described in FIGS. 1 and 2.

In the example shown in FIG. 5, the exclusivity loyalty index 502 is a loyalty index of the exclusivity loyalty factor proportion 506 of the entities 504 based on transaction details, such as those described above in FIGS. 1-4. The exclusivity loyalty factor proportion 506 represents a propensity for users to transact with a corresponding entity over other entities in a time period.

In the example, the user interface 500 presents icons of entities 504 and a corresponding exclusivity loyalty factor proportion 506 in a list. The icons include images, text descriptions, some combination of both, or some other visual representations. The user interface 500 or some other logic component automatically moves the icons representing the entities 504 and corresponding exclusivity loyalty factor proportion 506 to a position on the user interface 500 in descending order of exclusivity loyalty factor proportion 506. As shown in FIG. 5, the icons include a bar of varying length corresponding to the magnitude of the exclusivity loyalty factor proportion.

In some examples, the user interface 500 includes an average loyalty factor proportion 508 of all of the loyalty factor proportions shown on the user interface 500. The average loyalty factor proportion 508 includes text and icons displaying a numerical average of the loyalty factor proportions in addition to graphical elements showing the average loyalty factor proportion 508 in relation to the other loyalty factor proportions. In at least one example, the user interface 500 includes a color scheme 510 for the entities 504 and/or the loyalty factor proportions. The color scheme 510 includes a gradient of colors corresponding to the order of the loyalty factor proportions in the list, the magnitude of those loyalty factor proportions, a color assigned to proportions above or below the average loyalty index 508, or some other arrangement. Optionally, the user interface 500 includes a legend 511 that describes the meaning of the colors of the color scheme 510.

In some examples, the user interface 500 presents index icons of users of a particular entity above a transaction metric threshold. A sorter, such as shown in FIGS. 1-2, sorts a favorite entities list in descending order of transaction metric per entity. The sorter filters the favorites entities list to a particular entity and then filters the users of the particular entity above a transaction metric threshold. An application user may set or modify the transaction metric threshold. Next, the sorter presents the users above the transaction metric threshold and corresponding transaction metric as a user icon in a user interface 500. The sorter automatically moves the index icons to a list in the user interface in descending order of transaction metric. This list presents the users with the highest transaction metrics for an entity in the time period automatically.

FIG. 6 is an exemplary illustration of a user interface 600 operating on a computing device. The user interface 600 presents a transaction category loyalty index 602 representing users' loyalty to entities by transaction category along two loyalty factor calculations: exclusivity and stability. The horizontal axis 604 represents an exclusivity loyalty index and the vertical axis 606 represents a stability loyalty index. The user interface 600 presents the transaction category loyalty index 602 using text and images from a framework, such as the framework 102 as described in FIGS. 1 and 2.

In the example, the transaction category loyalty index 602 presents a ranking of users' loyalty among entities by transaction category along the two axes. Each transaction category 608 is presented as a circular icon with a corresponding text tag. The transaction categories are ranked in order of descending exclusivity loyalty factor proportion, from right to left, along the horizontal axis 604. Similarly, the same transaction categories are ranked in order of descending stability loyalty factor proportion, from top to bottom, along the vertical axis 606. UI elements 610 each describe a quadrant of the transaction category loyalty index 602 in plain language.

The user interface 600 may include additional or fewer elements that demonstrate results from the framework. In some examples, the transaction categories are colored according to a color scheme as described above in FIG. 5. Further, the size of the icons presented correspond to another metric, such as the total volume of transactions that occur within that transaction category or the number of unique users that made at least one transaction within that transaction category for example. The user interface 600 may also include an additional axis, not shown, to present the transaction category loyalty index along a third dimension representing an additional metric. Various examples of the disclosure use different data visualization techniques depending on the information being presented and the intended application user viewing the loyalty index.

In some examples, the system 200 of FIG. 2 is configured to present a loyalty index on the user interface 600 by the following method. The loyalty analyzer 108 retrieves transaction details for a plurality of users for a time period and a second time period. The loyalty analyzer 108 calculates a total entity transaction metric in the time period and the second time period by each user per entity. In at least one example, the metric filterer 230 applies a categorical filter 234 to filter the transaction details by transaction category. The loyalty analyzer 108 sorts the entities into user and secondary user lists by total entity transaction metric by each user per entity in the time period and the second time period respectively in descending order. The loyalty analyzer 108 filters out the entities in the user and secondary user lists by the entity with the highest total transaction metric by each user into a favorite and secondary favorite entities list, respectively. The loyalty analyzer 108 compares the favorite entities list with the secondary favorite entities list by user and calculates an exclusivity loyalty index and stability proportion. The sorter 110 presents the exclusivity loyalty index and stability proportions as icons on the user interface 600.

In some examples, the system 200 is further configured to present a transaction category loyalty index on the user interface 600 by the following method. The loyalty analyzer 108 calculates a total entity transaction metric in the time period by each user for each transaction category per entity then sorts the entities into lists by total entity transaction metric by each user for each transaction category per entity in the time period in descending order. The loyalty analyzer 108 calculates a total transaction metric in the time period for each user and calculates an entity proportion for each user for each transaction category. The loyalty analyzer 108 filters out the entities in the lists by the highest total entity transaction metric for each user for each transaction category into favorite entities lists for each transaction category. Next, the loyalty analyzer 108 calculates an exclusivity loyalty factor proportion for each transaction category which in some examples is the average value of entity proportion for each transaction category for each entity in the favorite entities list for each transaction category weighted by the total entity transaction metric of each user with that entity in each transaction category. Optionally, the loyalty analyzer 108 further calculates a stability loyalty factor proportion for each transaction category which is the number of entities that are the same on the favorite entities list and the secondary favorite entities list for each transaction category per user divided by the number of users. The sorter 110 presents the exclusivity loyalty index and stability proportions for each of the transaction categories as icons on the user interface 600. The transaction category loyalty index 602 is an illustrative example of following this method.

While the user interface 600 presents a transaction category loyalty index 602, the systems and methods of this disclosure enable one skilled in the art to present other types of loyalty indexes using the filtering techniques discussed herein. Automatically moving the icons in an ascending or descending order automatically saves computational resources and improves the human-computer interaction by lessening the likelihood that users will need to rearrange or reorder the presented information in the user interface 600.

FIG. 7 is an example user interface 700 displaying a loyalty matrix 702. The loyalty matrix 702 is a combination of a rationality index and a preference index. The horizontal axis 704 represents the preference index and the vertical axis 706 represents the rationality index. The loyalty matrix 702 can be generated and presented by system 200 of FIG. 2. Aspects of user interface 700 can be implemented as described for user interface 600 in FIG. 6.

The loyalty matrix 702 presents the proportions of two loyalty indexes: the preference index and the rationality index. As discussed above, the preference index represents an exclusivity loyalty index, a stability loyalty index, or both. In some implementations, the preference index presents an average ratio of an average proportion of the exclusivity loyalty index (A) and the average proportion of the stability loyalty index (B), such as shown by the following formula.

$$\text{Preference Index} = \frac{(A+B)}{2}$$

Similarly, the rationality index represents a convenience loyalty index, a prudence loyalty index, or both. In some implementations, the rationality index presents an average ratio of an average proportion of the convenience loyalty index (C) and the average proportion of the prudence loyalty index (D), such as shown by the following formula.

$$\text{Rationality Index} = \frac{(C+D)}{2}$$

In various implementations, the loyalty matrix 702 contains sub-components that are calculated for a given entity and a benchmark, such as an average of competitive entities to the given entity. Here, each of the exclusivity, stability, convenience, and prudence average loyalty factor proportions are calculated for both the given entity and the benchmark. In some implementations, the exclusivity, stability, convenience, and prudence loyalty factor proportions are based on competitive entity details, at least in part. The preference and rationality indexes then represent the proportions between the given entity and the benchmark for each of the four sub-loyalty indexes, such as shown by the following formulas.

$$A = \text{entity exclusivity ratio: benchmark exclusivity ratio}$$

$$B = \text{entity stability ratio: benchmark stability ratio}$$

$$C = \text{entity convenience ratio: benchmark convenience ratio}$$

$$D = \text{entity prudence ratio: benchmark prudence ratio}$$

Depending on how the convenience and prudence loyalty factor proportions are calculated, an additional directional adjustment is performed. As the rationality index conveys whether it is rational for users to transact with an entity and all other proportions have an interpretation that a proportion of one is better than below, it is desirable to keep the same directional interpretation for the rationality index as well. In other words, it is useful to portray values of C and D above one as meaning more rational and more convenient than below 1. The adjusted formulas are: $C_{adjusted}=1+(1-C)$ and $D_{adjusted}=1+(1-D)$. The adjusted rationality index formula is thus the following:

$$\text{Rationality Index} = \frac{(C_{adjusted} + D_{adjusted})}{2}$$

In at least one implementation, each component is weighted before calculating the loyalty matrix to reflect the importance of that component. It is not necessary for each component to be reflected as an arithmetic average.

In some implementations, the exclusivity, stability, convenience, and prudence loyalty factor proportions are calculated in the aggregate for the analyzed entity and for competitive entities to the analyzed entity. An example of a complete loyalty matrix is as follows focused on a given entity X. The exclusivity, stability, convenience, and prudence loyalty factor proportions are calculated for entity X and for competitive entities to entity X in the same transaction category according to the following table.

| Loyalty matrix components | Loyalty matrix sub-components (factor) | Average proportion of subject entity (Entity X) | Average proportion (competitive entities) | Ratio of subject entity vs benchmark | Ratio directionally adjusted subject entity vs benchmark |
|---|---|---|---|---|---|
| | | Sub-index calculation | | | |
| Preference | Exclusivity (A) | 75% | 50% | 1.50 | 1.50 |
| | Stability (B) | 90% | 70% | 1.29 | 1.29 |
| Rationality | Convenience (C) | 0.9 | 0.95 | 0.95 | 1.05 |
| | Prudence (D) | 1.05 | 0.95 | 1.11 | 0.89 |
| | | Total index calculation for loyalty matrix positioning vs the benchmark | | | |
| Preference | Average (total) (A + B)/2 | | | 1.39 | 1.39 |
| Rationality | Average (total) ($C_{adj}$ + $D_{adj}$)/2 | | | 1.03 | 0.97 |

The interpretation of the preference and rationality index proportions is shown according to the following interpretation matrix:

| Segment of the matrix | Preference index ratio | Rationality index ratio | Interpretation |
|---|---|---|---|
| 1 | ≥1 | ≥1 | Rational Loyalty/Loyalty of convenience/rationality (marriage of convenience)/loyalty of mind. Users are more loyal than to the competition but there are rational drivers for such behavior |
| 2 | ≥1 | <1 | True loyalty/Not rational loyalty/loyalty of heart/marriage of love/loyalty of preference. Users are more loyal despite the choice of entity not being the closest/least expensive option |
| 3 | <1 | ≥1 | Irrational avoidance/Irrational inconstancy. Users are less loyal than average among competition, despite the subject entity being the most convenient option |
| 4 | <1 | <1 | Rational avoidance/rational inconstancy. Users are less loyal to the subject entity but there are rational reasons for it (more convenient, less expensive options are available) |

In the example above, entity X has a preference loyalty index proportion of 1.39 and an adjusted rationality loyalty index proportion of 0.97. Thus, entity X falls under the second segment: loyalty above one and rationality below one, meaning the entity has more loyal users than the average competitive entity, yet there are rationally better options (less expensive and/or closer to the user). This would be marked as "true loyalty".

The loyalty matrix 702 of FIG. 7 presents a ranking of users' loyalty among entities along the two axes. Each entity 708 is presented as a circular icon with a corresponding text tag. The entities are ranked in order of descending preference loyalty index proportion, from right to left, along the horizontal axis 704. Similarly, the same entities are ranked in order of descending rationality loyalty index proportion, from top to bottom, along the vertical axis 706. UI elements 710 each describe a quadrant of the loyalty matrix 702 in plain language.

Exemplary Operating Environment

Figure 8:
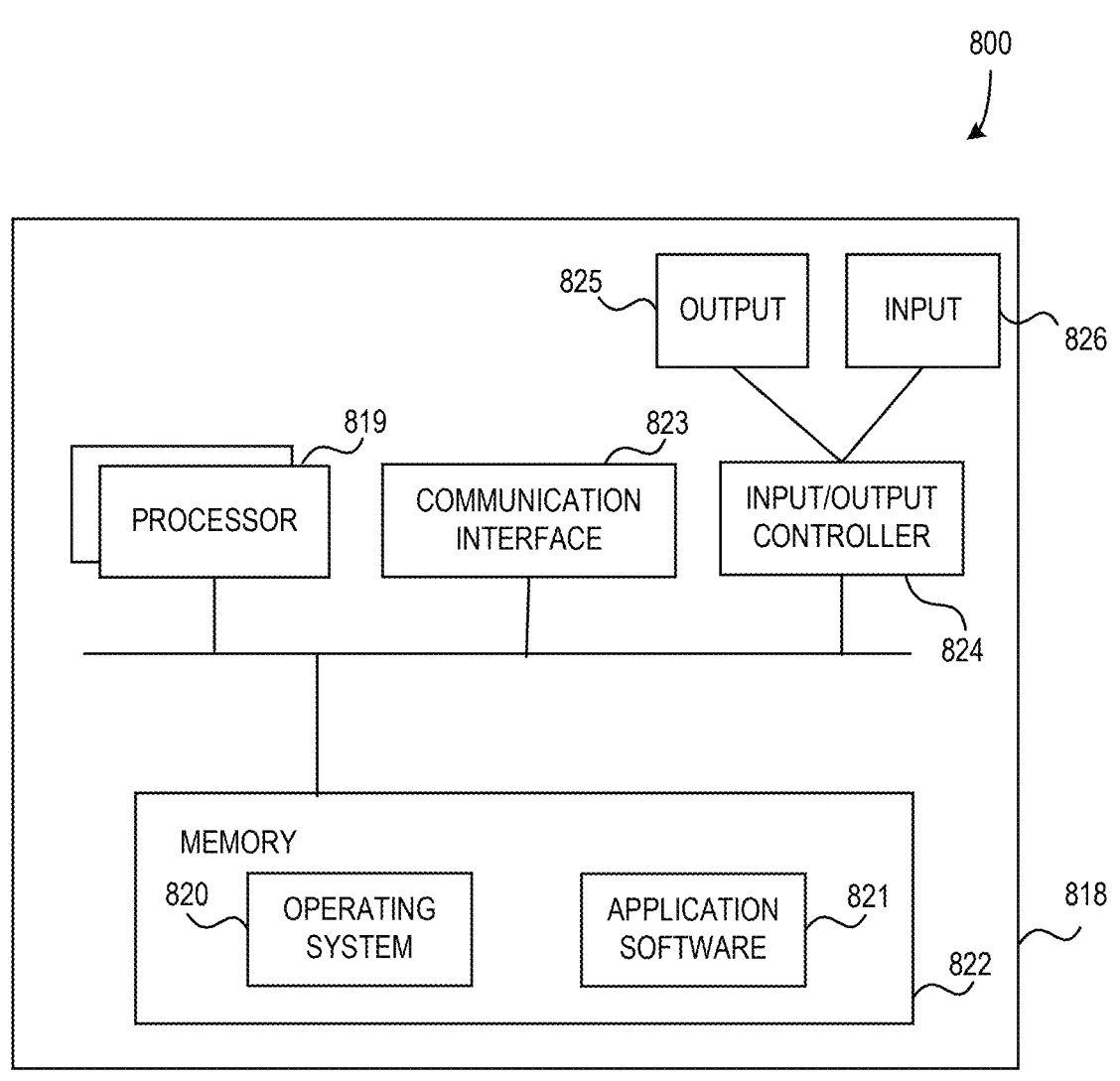
FIG. 8 illustrates an example computing apparatus according to an example.

The present disclosure is operable with a computing apparatus according to an implementation as a functional block diagram of a computing system 800 in FIG. 8. In an implementation, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the apparatus 818 to enable application software 821 to be executed on the device.

Computer executable instructions may be provided using any computer-readable media that are accessible by the computing apparatus 818. Computer-readable media may include, for example, computer storage media such as a memory 822 and communications media. Computer storage media, such as the memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals are not examples of computer storage media. Although the computer storage medium (the memory 822) is shown within the computing apparatus 818, it will be appreciated by a person skilled in the art that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one implementation, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an implementation, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

An example computer system comprises: a processor; and a computer storage medium storing instructions that are operative upon execution by the processor to: retrieve transaction details for a plurality of users for a time period, wherein the transaction details comprise a user identifier, a transaction amount, a transaction date, and an entity identifier for each transaction in the time period; calculate a total entity transaction amount in the time period by each user per entity; sort the entities into user lists by total entity transaction amount by each user per entity in the time period in descending order; calculate a total user transaction amount in the time period for each user; calculate an entity proportion for each entity per user, wherein the entity proportion is a proportion of the total user transaction amount that each user transacted with each entity in the time period; filter out the entities in the user lists by the highest total entity transaction amount for each user into a favorite entities list; calculate an exclusivity loyalty factor proportion, wherein the exclusivity loyalty factor proportion is an average value of the entity proportion for each entity in the favorite entities list weighted by the total entity transaction amount of each user with that entity; present each entity and corresponding exclusivity loyalty factor proportion as an index icon in a user interface; automatically move the index icons to a list in the user interface in descending order of exclusivity loyalty factor proportion.

Another example system comprises instructions that are further operative to retrieve transaction details for the plurality of users for a second time period; calculate a total entity transaction amount in the second time period by each user per entity; sort the entities into secondary user lists by total entity transaction amount by each user per entity in the second time period in descending order; filter out the entities in the secondary user lists by the entity with the highest total transaction metric by each user into a secondary favorite entities list; compare the favorite entities list with the secondary favorite entities list by user; and calculate a stability loyalty factor proportion, wherein the stability loyalty factor proportion is a number of entities that are the same on the favorite entities list and the secondary favorite entities list per user divided by the number of users; present the stability loyalty factor proportion with the corresponding index icon in the user interface; and automatically move the index icons to a list in the user interface in descending order of stability loyalty factor proportion that is perpendicular to the list of exclusivity loyalty factor proportion. In some implementations, the transaction details further comprise a transaction category for each transaction.

An additional example system may comprises instructions that are further operative to calculate a total entity transaction metric in the time period by each user for each transaction category per entity; sort the entities into lists by total entity transaction metric by each user for each transaction category per entity in the time period in descending order; calculate a total transaction metric in the time period for each user; calculate an entity proportion for each user for each transaction category; filter out the entities in the lists by the highest total entity transaction metric for each user for each transaction category into a favorite entities lists for each transaction category; and calculate an exclusivity loyalty factor proportion for each transaction category, wherein the exclusivity loyalty factor proportion for each transaction category is an average value of entity proportion for each transaction category for each entity in the favorite entities list for each transaction category weighted by the total entity transaction metric of each user with that entity in each transaction category.

A further additional example system comprises instructions that are further operative to sort the favorite entities list in descending order of transaction metric per entity; filter the favorites entities list to a particular entity; filter the users of the particular entity above a transaction metric threshold; present the users above the transaction metric threshold and a corresponding transaction metric as index icons in a user interface; and automatically move the index icons to a list in the user interface in descending order of transaction metric.

A yet further additional example system comprises instructions that are further operative to calculate a total entity transaction metric in the time period by each user per entity where the geographic location of the user is beyond a specified distance from the geographic location of the entity; sort the entities beyond the specified distance into lists by total entity transaction metric by each user for each transaction subject per entity in the time period in descending order; calculate an entity proportion for each user beyond the specified distance; filter out the entities in the lists beyond the specified distance by the highest total entity transaction metric for each user into a favorite distant entities list; and calculate an exclusivity loyalty factor proportion for entities beyond the specified distance, wherein the exclusivity loyalty factor proportion for each transaction beyond the specified distance is an average value of entity for each entity in the favorite distant entities list weighted by the total entity transaction metric of each user with that entity beyond the specified distance; present the entities, corresponding exclusivity loyalty factor proportion beyond the specified distance, and the specified distance as index icons in a user interface; and automatically move the index icons to a list in the user interface in descending order of exclusivity loyalty factor proportion beyond the specified distance. In some implementations, the transaction metric is a transaction amount.

An example method for automatically presenting a loyalty index comprises: retrieving transaction details for a plurality of users for a time period, wherein the transaction details comprise a user identifier, a transaction metric, a transaction date, and an entity identifier for each transaction in the time period; calculating a first loyalty factor proportion for an entity based on the transaction details; calculating a second loyalty factor proportion for the entity based on the transaction details; presenting the first loyalty factor proportion and second loyalty factor proportion for the entity as index icons in a user interface; automatically moving the index icons to a list in the user interface in descending order of the first loyalty factor proportion; and automatically moving the index icons to a list in the user interface in descending order of the second loyalty factor proportion.

Another example method comprises the operations above and further comprises: presenting a first axis based on the preference loyalty index proportion in the user interface; and presenting a second axis based on the rationality loyalty index proportion in the user interface, wherein the list of descending order of the preference loyalty index proportion is arranged according to a value of the preference loyalty index proportion of each index icon along the first axis, and wherein the list of descending order of the rationality loyalty index proportion is arranged according to a value of the rationality loyalty index proportion of each index icon along the second axis.

In some implementations, the first loyalty factor proportion is an average value of an entity proportion weighted by a total transaction metric of each user with that entity. In other implementations, the second loyalty factor proportion is a stability loyalty factor proportion. In yet other implementations, the total transaction metric is a total transaction amount. In still other implementations, wherein the total transaction metric is a total number of transactions. In yet other implementations, the total transaction metric is a total number of visits.

An additional example method for automatically presenting a loyalty matrix comprises: retrieving transaction details for a plurality of users for a plurality of time periods, wherein the transaction details comprise a user identifier, a user location, a transaction metric, a transaction date, an entity identifier, and an entity location for each transaction; calculating an exclusivity loyalty factor proportion, a stability loyalty factor proportion, a convenience loyalty factor proportion, and a prudence loyalty factor proportion for an entity based on the transaction details; calculating a preference loyalty index proportion for the entity, wherein the preference loyalty index proportion is a sum of the exclusivity loyalty factor proportion and the stability loyalty factor proportion divided by two; calculating a rationality loyalty index proportion for the entity, wherein the rationality loyalty index proportion is a sum of the convenience loyalty factor proportion and the prudence loyalty factor proportion divided by two; presenting the preference loyalty index proportion and the rationality loyalty index proportion for the entity as index icons in a user interface; automatically moving the index icons to a list in the user interface in descending order of the preference loyalty index proportion; and automatically moving the index icons to a list in the user interface in descending order of the rationality loyalty index proportion.

Another additional method comprises the operations above in addition to operations comprising: presenting a first axis based on the preference loyalty index proportion in the user interface; and presenting a second axis based on the rationality loyalty index proportion in the user interface, wherein the list of descending order of the preference loyalty index proportion is arranged according to a value of the preference loyalty index proportion of each index icon along the first axis, and wherein the list of descending order of the rationality loyalty index proportion is arranged according to a value of the rationality loyalty index proportion of each index icon along the second axis.

A yet other method comprises the operations of the additional method in addition to operations comprising: retrieving competitive entity details, wherein the exclusivity loyalty factor proportion, the stability loyalty factor proportion, the convenience loyalty factor proportion, and the prudence loyalty factor proportion for an entity are further based on competitive entity details, wherein the exclusivity loyalty factor proportion is a proportion of an aggregate exclusivity loyalty proportion for the entity to an aggregate exclusivity loyalty factor proportion for competitive entities, wherein the stability loyalty factor proportion is the proportion of an aggregate stability loyalty factor proportion for the entity to an aggregate stability loyalty factor proportion for competitive entities, wherein the convenience loyalty factor proportion is the proportion of an aggregate convenience loyalty factor proportion for the entity to an aggregate convenience loyalty factor proportion for competitive entities, and wherein the prudence loyalty factor proportion is the proportion of an aggregate prudence loyalty factor proportion for the entity to an aggregate prudence loyalty factor proportion for competitive entities.

In some implementations, the exclusivity loyalty factor proportion is an average value of a proportion of total user visits between the entity and an average competitive entity weighted by a total transaction metric of each user with that entity. In another implementation, the convenience loyalty factor proportion is an average value of a proportion of distance between a user location to an entity location and the user location to a nearest competitive entity location weighted by a total transaction metric of each user with hat entity. In yet another implementation, the prudence loyalty factor proportion is an average value of a proportion of average transaction expense between the entity and an average competitive entity weighted by a total transaction metric of each user with that entity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is understood that the benefits and advantages described above may relate to one implementation or may relate to several implementations. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for presenting a loyalty index, the system comprising:

a processor; and a computer storage medium storing instructions that are operative upon execution by the processor to:

retrieve transaction details for a plurality of users for a time period, wherein the transaction details comprise a user identifier, a transaction metric, a transaction date, and an entity identifier for each transaction in the time period;

calculate a total entity transaction metric in the time period by each user per entity;

sort the entities into user lists by total entity transaction metric by each user per entity in the time period in descending order;

calculate a total user transaction metric in the time period for each user, wherein the total user transaction metric is a summation of the total entity transaction metric of each entity that the user transacted with in the time period;

calculate an entity proportion for each entity per user, wherein the entity proportion is a proportion of the total entity transaction metric to the total user transaction metric;

filter out the entities in the user lists by a highest total entity transaction metric for each user into a favorite entities list;

calculate an exclusivity loyalty factor proportion, wherein the exclusivity loyalty factor proportion is an average value of the entity proportion for each entity in the favorite entities list weighted by the total entity transaction metric of each user with that entity;

train a machine learning model with the transaction details using the exclusivity loyalty factor proportion;

predict loyalty indexes using the trained machine learning model;

automatically generate and present, for each entity and corresponding exclusivity loyalty factor proportion, index icons associated with the loyalty indexes, the index icons including a natural language description of the exclusivity loyalty factor proportion in a user interface; and automatically move the index icons to a list in the user interface in descending order of the exclusivity loyalty factor proportion without user input, thereby reducing user interaction events and associated computational processing.

2. The system of claim 1, wherein the instructions are further operative to:

retrieve transaction details for the plurality of users for a second time period;

calculate a total entity transaction metric in the second time period by each user per entity;

sort the entities into secondary user lists by total entity transaction metric by each user per entity in the second time period in descending order;

filter out the entities in the secondary user lists by a highest total entity transaction metric for each user into a secondary favorite entities list;

compare the favorite entities list with the secondary favorite entities list by user;

calculate a stability loyalty factor proportion, wherein the stability loyalty factor proportion is a number of entities that are the same on the favorite entities list and the secondary favorite entities list per user divided by the number of users;

present the stability loyalty factor proportion with a corresponding index icon in the user interface; and automatically move the index icon to a list in the user interface in descending order of stability loyalty factor proportion that is perpendicular to the list of exclusivity loyalty factor proportion.

3. The system of claim 1, wherein the transaction details further comprise a transaction category for each transaction.

4. The system of claim 3, wherein the instructions are further operative to:

calculate a total entity transaction metric in the time period by each user for each transaction category per entity;

sort the entities into lists by total entity transaction metric by each user for each transaction category per entity in the time period in descending order;

calculate a total transaction metric in the time period for each user;

calculate an entity proportion for each user for each transaction category;

filter out the entities in the lists by the highest total entity transaction metric for each user for each transaction category into a favorite entities lists for each transaction category; and calculate an exclusivity loyalty factor proportion for each transaction category, wherein the exclusivity loyalty factor proportion for each transaction category is an average value of entity proportion for each transaction category for each entity in the favorite entities list for each transaction category weighted by the total entity transaction metric of each user with that entity in each transaction category.

5. The system of claim 1, wherein the instructions are further operative to:

sort the favorite entities list in descending order of transaction metric per entity;

filter the favorites entities list to a particular entity;

filter the users of the particular entity above a transaction metric threshold;

present the users above the transaction metric threshold and a corresponding transaction metric as index icons in a user interface; and automatically move the index icons to a list in the user interface in descending order of transaction metric.

6. The system of claim 1, wherein the transaction details further comprise a geographic location of the entity and the user, and wherein the instructions are further operative to:

calculate a total entity transaction metric in the time period by each user per entity where the geographic location of the user is beyond a specified distance from the geographic location of the entity;

sort the entities beyond the specified distance into lists by total entity transaction metric by each user for each transaction subject per entity in the time period in descending order;

calculate an entity proportion for each user beyond the specified distance;

filter out the entities in the lists beyond the specified distance by the highest total entity transaction metric for each user into a favorite distant entities list;

calculate an exclusivity loyalty factor proportion for entities beyond the specified distance, wherein the exclusivity loyalty factor proportion for each transaction beyond the specified distance is an average value of entity for each entity in the favorite distant entities list weighted by the total entity transaction metric of each user with that entity beyond the specified distance;

present the entities, corresponding exclusivity loyalty factor proportion beyond the specified distance, and the specified distance as index icons in a user interface; and automatically move the index icons to a list in the user interface in descending order of exclusivity loyalty factor proportion beyond the specified distance.

7. The system of claim 6, wherein the total entity transaction metric is a transaction amount.

8. A method for presenting a loyalty index, the method comprising:

retrieving transaction details for a plurality of users for a time period, wherein the transaction details comprise a user identifier, a transaction metric, a transaction date, and an entity identifier for each transaction in the time period;

calculating a total entity transaction metric in the time period by each user per entity;

sorting the entities into user lists by total entity transaction metric by each user per entity in the time period in descending order;

calculating a total user transaction metric in the time period for each user, wherein the total user transaction metric is a summation of the total entity transaction metric of each entity that the user transacted with in the time period;

calculating an entity proportion for each entity per user, wherein the entity proportion is a proportion of the total entity transaction metric to the total user transaction metric;

filtering out the entities in the user lists by a highest total entity transaction metric for each user into a favorite entities list;

calculating an exclusivity loyalty factor proportion, wherein the exclusivity loyalty factor proportion is an average value of the entity proportion for each entity in the favorite entities list weighted by the total entity transaction metric of each user with that entity;

training a machine learning model with the transaction details using the exclusivity loyalty factor proportion;

predicting loyalty indexes using the trained machine learning model;

automatically generating and presenting, for each entity and corresponding exclusivity loyalty factor proportion, index icons associated with the loyalty indexes, the index icons including a natural language description of the exclusivity loyalty factor proportion in a user interface; and automatically moving the index icons to a list in the user interface in descending order of the exclusivity loyalty factor proportion without user input, thereby reducing user interaction events and associated computational processing.

9. The method of claim 8, further comprising:

retrieving transaction details for the plurality of users for a second time period;

calculating a total entity transaction metric in the second time period by each user per entity;

sorting the entities into secondary user lists by total entity transaction metric by each user per entity in the second time period in descending order;

filtering out the entities in the secondary user lists by a highest total entity transaction metric for each user into a secondary favorite entities list;

comparing the favorite entities list with the secondary favorite entities list by user;

calculating a stability loyalty factor proportion, wherein the stability loyalty factor proportion is a number of entities that are the same on the favorite entities list and the secondary favorite entities list per user divided by the number of users;

presenting the stability loyalty factor proportion with a corresponding index icon in the user interface; and automatically moving the index icon to a list in the user interface in descending order of stability loyalty factor proportion that is perpendicular to the list of exclusivity loyalty factor proportion.

10. The method of claim 8, wherein the transaction details further comprise a transaction category for each transaction.

11. The method of claim 10, further comprising:

calculating a total entity transaction metric in the time period by each user for each transaction category per entity;

sorting the entities into lists by total entity transaction metric by each user for each transaction category per entity in the time period in descending order;

calculating a total transaction metric in the time period for each user;

calculating an entity proportion for each user for each transaction category;

filtering out the entities in the lists by the highest total entity transaction metric for each user for each transaction category into a favorite entities lists for each transaction category; and calculating an exclusivity loyalty factor proportion for each transaction category, wherein the exclusivity loyalty factor proportion for each transaction category is an average value of entity proportion for each transaction category for each entity in the favorite entities list for each transaction category weighted by the total entity transaction metric of each user with that entity in each transaction category.

12. The method of claim 8, further comprising:

sorting the favorite entities list in descending order of transaction metric per entity;

filtering the favorites entities list to a particular entity;

filtering the users of the particular entity above a transaction metric threshold;

presenting the users above the transaction metric threshold and a corresponding transaction metric as index icons in a user interface; and automatically moving the index icons to a list in the user interface in descending order of transaction metric.

13. The method of claim 8, wherein the transaction details further comprise a geographic location of the entity and the user, and wherein the method further comprising:

calculating a total entity transaction metric in the time period by each user per entity where the geographic location of the user is beyond a specified distance from the geographic location of the entity;

sorting the entities beyond the specified distance into lists by total entity transaction metric by each user for each transaction subject per entity in the time period in descending order;

calculating an entity proportion for each user beyond the specified distance;

filtering out the entities in the lists beyond the specified distance by the highest total entity transaction metric for each user into a favorite distant entities list;

calculating an exclusivity loyalty factor proportion for entities beyond the specified distance, wherein the exclusivity loyalty factor proportion for each transaction beyond the specified distance is an average value of entity for each entity in the favorite distant entities list weighted by the total entity transaction metric of each user with that entity beyond the specified distance;

presenting the entities, corresponding exclusivity loyalty factor proportion beyond the specified distance, and the specified distance as index icons in a user interface; and automatically moving the index icons to a list in the user interface in descending order of exclusivity loyalty factor proportion beyond the specified distance.

14. The method of claim 13, wherein the total entity transaction metric is a transaction amount.

15. A non-transitory computer storage medium storing instructions that are operative upon execution by a processor to:

retrieve transaction details for a plurality of users for a time period, wherein the transaction details comprise a user identifier, a transaction metric, a transaction date, and an entity identifier for each transaction in the time period;

calculate a total entity transaction metric in the time period by each user per entity;

sort the entities into user lists by total entity transaction metric by each user per entity in the time period in descending order;

calculate a total user transaction metric in the time period for each user, wherein the total user transaction metric is a summation of the total entity transaction metric of each entity that the user transacted with in the time period;

calculate an entity proportion for each entity per user, wherein the entity proportion is a proportion of the total entity transaction metric to the total user transaction metric;

filter out the entities in the user lists by a highest total entity transaction metric for each user into a favorite entities list;

calculate an exclusivity loyalty factor proportion, wherein the exclusivity loyalty factor proportion is an average value of the entity proportion for each entity in the favorite entities list weighted by the total entity transaction metric of each user with that entity;

train a machine learning model with the transaction details using the exclusivity loyalty factor proportion;

predict loyalty indexes using the trained machine learning model;

automatically generate and present, for each entity and corresponding exclusivity loyalty factor proportion, index icons associated with the loyalty indexes, the index icons including a natural language description of the exclusivity loyalty factor proportion in a user interface; and automatically move the index icons to a list in the user interface in descending order of the exclusivity loyalty factor proportion without user input, thereby reducing user interaction events and associated computational processing.

16. The computer storage medium of claim 15, wherein the instructions are further operative to:

retrieve transaction details for the plurality of users for a second time period;

calculate a total entity transaction metric in the second time period by each user per entity;

sort the entities into secondary user lists by total entity transaction metric by each user per entity in the second time period in descending order;

filter out the entities in the secondary user lists by a highest total entity transaction metric for each user into a secondary favorite entities list;

compare the favorite entities list with the secondary favorite entities list by user;

calculate a stability loyalty factor proportion, wherein the stability loyalty factor proportion is a number of entities that are the same on the favorite entities list and the secondary favorite entities list per user divided by the number of users;

present the stability loyalty factor proportion with a corresponding index icon in the user interface; and automatically move the index icon to a list in the user interface in descending order of stability loyalty factor proportion that is perpendicular to the list of exclusivity loyalty factor proportion.

17. The computer storage medium of claim 15, wherein the transaction details further comprise a transaction category for each transaction.

18. The computer storage medium of claim 17, wherein the instructions are further operative to:

calculate a total entity transaction metric in the time period by each user for each transaction category per entity;

sort the entities into lists by total entity transaction metric by each user for each transaction category per entity in the time period in descending order;

calculate a total transaction metric in the time period for each user;

calculate an entity proportion for each user for each transaction category;

filter out the entities in the lists by the highest total entity transaction metric for each user for each transaction category into a favorite entities lists for each transaction category; and calculate an exclusivity loyalty factor proportion for each transaction category, wherein the exclusivity loyalty factor proportion for each transaction category is an average value of entity proportion for each transaction category for each entity in the favorite entities list for each transaction category weighted by the total entity transaction metric of each user with that entity in each transaction category.

19. The computer storage medium of claim 15, wherein the instructions are further operative to:

sort the favorite entities list in descending order of transaction metric per entity;

filter the favorites entities list to a particular entity;

filter the users of the particular entity above a transaction metric threshold;

present the users above the transaction metric threshold and a corresponding transaction metric as index icons in a user interface; and automatically move the index icons to a list in the user interface in descending order of transaction metric.

20. The computer storage medium of claim 15, wherein the transaction details further comprise a geographic location of the entity and the user, and wherein the instructions are further operative to:

calculate a total entity transaction metric in the time period by each user per entity where the geographic location of the user is beyond a specified distance from the geographic location of the entity;

sort the entities beyond the specified distance into lists by total entity transaction metric by each user for each transaction subject per entity in the time period in descending order;

calculate an entity proportion for each user beyond the specified distance;

filter out the entities in the lists beyond the specified distance by the highest total entity transaction metric for each user into a favorite distant entities list;

calculate an exclusivity loyalty factor proportion for entities beyond the specified distance, wherein the exclusivity loyalty factor proportion for each transaction beyond the specified distance is an average value of entity for each entity in the favorite distant entities list weighted by the total entity transaction metric of each user with that entity beyond the specified distance;

present the entities, corresponding exclusivity loyalty factor proportion beyond the specified distance, and the specified distance as index icons in a user interface; and automatically move the index icons to a list in the user interface in descending order of exclusivity loyalty factor proportion beyond the specified distance.

* * * * *